United States Patent
Blendea

(10) Patent No.: US 7,585,027 B2
(45) Date of Patent: Sep. 8, 2009

(54) OVERMOLDED THIN-PROFILE LUMBAR SUPPORT

(75) Inventor: Horia Blendea, LaSalle (CA)

(73) Assignee: Schukra of North America, Lakeshore-Tecumseh (CA)

( * ) Notice: Subject to any disclaimer, the term of this patent is extended or adjusted under 35 U.S.C. 154(b) by 0 days.

(21) Appl. No.: 11/400,436

(22) Filed: Apr. 7, 2006

(65) Prior Publication Data

US 2007/0236063 A1   Oct. 11, 2007

(51) Int. Cl.
*A47C 7/14* (2006.01)
*A47C 7/46* (2006.01)

(52) U.S. Cl. .................. 297/284.4; 297/284.1

(58) Field of Classification Search ............ 297/284.4, 297/284.1
See application file for complete search history.

(56) References Cited

U.S. PATENT DOCUMENTS

| | | | | |
|---|---|---|---|---|
| 4,354,709 A * | 10/1982 | Schuster | .................. | 297/284.4 |
| 4,452,485 A * | 6/1984 | Schuster | .................. | 297/284.4 |
| 5,114,209 A | 5/1992 | Dunn | | |
| 5,143,057 A | 9/1992 | DePasquale | | |
| 5,733,493 A | 3/1998 | Katsuno et al. | | |
| 6,125,521 A | 10/2000 | Stumpf et al. | | |
| 6,179,362 B1 | 1/2001 | Wisniewski et al. | | |
| 6,234,578 B1 | 5/2001 | Barton et al. | | |
| 6,338,530 B1 * | 1/2002 | Gowing | .................. | 297/284.4 |
| 6,575,530 B1 | 6/2003 | Fischer et al. | | |
| 6,644,740 B2 | 11/2003 | Holst et al. | | |
| 6,676,214 B2 * | 1/2004 | McMillen et al. | ..... | 297/284.4 X |
| 6,688,686 B1 | 2/2004 | McEvoy et al. | | |
| 6,692,074 B1 * | 2/2004 | Kopetzky et al. | ..... | 297/284.4 X |
| 6,739,673 B2 | 5/2004 | Gupta et al. | | |
| 6,758,522 B2 | 7/2004 | Ligon, Sr. et al. | | |
| 6,811,218 B2 | 11/2004 | Deimen et al. | | |
| 6,893,089 B2 * | 5/2005 | McMillen et al. | ........ | 297/284.4 |
| 6,905,170 B2 * | 6/2005 | McMillen et al. | ........ | 297/284.4 |
| 6,966,604 B2 | 11/2005 | Stumpf et al. | | |
| 6,969,115 B2 | 11/2005 | Bourdkane et al. | | |
| 6,983,997 B2 | 1/2006 | Wilkerson et al. | | |
| 6,997,515 B2 | 2/2006 | Gupta et al. | | |
| 7,011,369 B2 * | 3/2006 | Massara et al. | .......... | 297/284.4 |
| 7,097,247 B2 * | 8/2006 | Battey et al. | ............. | 297/284.4 |
| 7,120,984 B2 * | 10/2006 | Rutsch | ................ | 297/284.4 X |
| 7,137,664 B2 * | 11/2006 | McMillen et al. | ........ | 297/284.4 |
| 7,140,680 B2 * | 11/2006 | McMillen et al. | ..... | 297/284.4 X |
| 7,201,446 B2 * | 4/2007 | Massara et al. | .......... | 297/284.4 |
| 7,309,105 B2 * | 12/2007 | Mundell et al. | .......... | 297/284.4 |
| 7,425,036 B2 * | 9/2008 | McMillen | ................ | 297/284.4 |
| 2005/0231013 A1 | 10/2005 | Knoblock et al. | | |
| 2005/0280299 A1 * | 12/2005 | Vogt et al. | ................ | 297/284.4 |
| 2006/0061170 A1 | 3/2006 | Massara et al. | | |
| 2007/0057550 A1 * | 3/2007 | Beyer et al. | ............. | 297/284.4 |

* cited by examiner

*Primary Examiner*—Rodney B White
(74) *Attorney, Agent, or Firm*—Kang Intellectual Property Law, LLC; Grant D. Kang

(57) ABSTRACT

An adjustable lumbar support has a guide wire assembly and a support basket, at least one of which comprises overmolded plastic components, wherein the support basket is slidably engaged with the guide wire assembly, and at least one actuator operably engaged with the support basket.

32 Claims, 21 Drawing Sheets

OVERMOLDED THIN-PROFILE LUMBAR SUPPORT

CROSS-REFERENCE TO RELATED APPLICATIONS

None.

BACKGROUND OF THE INVENTION

1. Field of the Invention

The present invention relates to ergonomic support devices for seats, particularly lumbar supports, and the use of plastic overmolding to make such parts to produce a seat with a slim profile.

2. Related Art

There is a need for seats which when folded down are more compact and when in the upright position take up less cabin space. There is also a need more generally for simpler designs for ergonomic devices that are less costly to manufacture and assemble.

Previous ergonomic support devices have employed metal parts where strength and flexibility are needed. However, metal parts, for example parts made from stamped sheet metal, require more steps to manufacture and assemble and thus cost more to make.

Plastic parts have also been used where possible due to the light weight and ease of manufacture of plastic. However certain parts, particularly lumbar support baskets which undergo repeated flexing such as in massaging lumbar systems, require the strength and flexibility of metal in order to withstand the stresses associated with use.

Many ergonomic support devices have combined plastic and metal parts to gain the advantages of each material. However, the parts are made separately and assembled later, adding cost to the manufacturing and assembly process.

What is needed is a method of combining the advantages of plastic and metal components in a way that minimizes costs associated with manufacture and assembly of ergonomic supports and also enables ergonomic supports to be made which have a slimmer profile but still maintain full, robust functionality.

SUMMARY OF THE INVENTION

In one embodiment the invention is a lumbar support basket comprising a wire frame having a plurality of support wires and a plastic support basket overmolded onto the wire frame.

In another embodiment the invention is a lumbar support guide wire comprising at least one wire and at least one bracket overmolded onto the wire.

In still another embodiment the invention is a method of assembling a lumbar support, comprising the steps of providing a guide wire assembly and a support basket, overmolding plastic onto at least one of the guide wire assembly and the support basket; providing at least one actuator; engaging the actuator with the support basket; and attaching the support basket to the guide wire.

In yet another embodiment the invention is an adjustable lumbar support comprising a guide wire assembly and a support basket, at least one of which comprises overmolded plastic, wherein the support basket is slidably engaged with the guide wire assembly; and at least one actuator operably engaged with the support basket.

In another embodiment the invention is an adjustable lumbar support comprising a guide wire assembly and a support basket, at least one of which comprises overmolded plastic components, wherein the support basket is slidably engaged with the guide wire assembly; and at least one actuator operably engaged with the support basket.

In another embodiment the invention is a lumbar support basket comprising a wire frame comprising a plurality of support wires and a plastic support basket overmolded onto the wire frame, wherein the lumbar support basket has a thickness of less than fifteen millimeters in a central region.

In still another embodiment the invention is a lumbar support basket comprising a wire frame comprising a plurality of support wires; a plastic support basket overmolded onto the wire frame; and at least one crosswire pivotably engaged with the plastic support basket, the crosswire further comprising a pulley overmolded thereon.

In yet another embodiment the invention is a clip for pivotably attaching a wire to a lumbar support comprising a plurality of interleaved plastic fingers overmolded onto a wire, wherein the fingers are not attached to one another and wherein at least two of the fingers are in an opposing configuration, the fingers being integrally molded with a lumbar support basket such that the wire is rotatably attached to the lumbar support basket, each of the fingers partially surrounding the wire.

In still another embodiment the invention is a bracket for attaching a cable to a lumbar support device comprising a first integral bushing for receiving a cable sleeve; and a first integral guide track for guiding a cable through a turn, the first guide track having a proximal end and a distal end, the proximal end being approximately collinear with the first bushing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
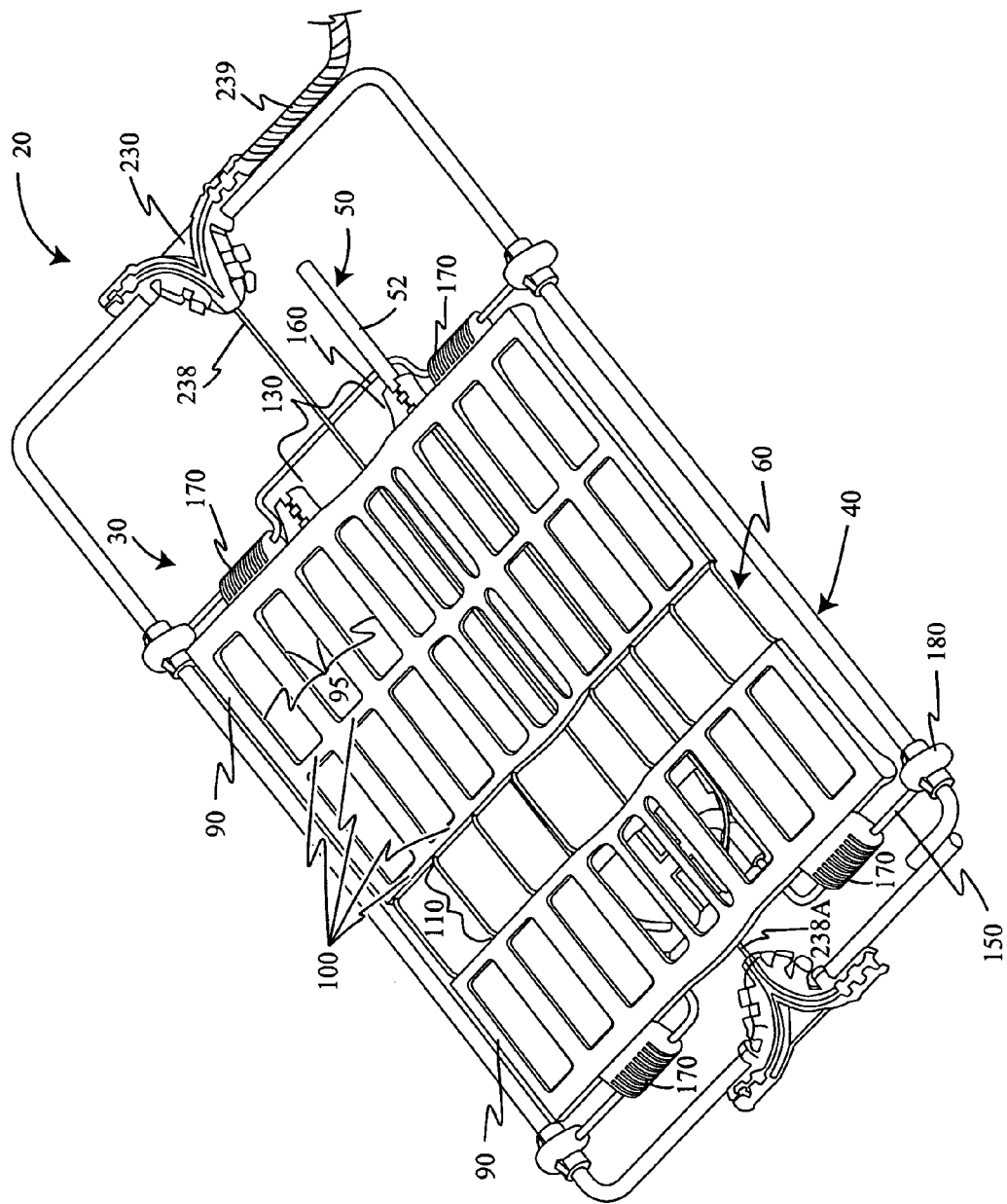
FIG. 1A shows a perspective view, looking at the 'front' side, i.e. the side on which a seat occupant rests, of an exemplary embodiment of a thin-seat lumbar support having an overmolded basket.

The following description of the preferred embodiment(s) is merely exemplary in nature and is in no way intended to limit the invention, its application, or uses.

In general an adjustable lumbar support consists of a flexible support structure called a 'basket' which is typically flexed into an arched shape to provide support to a seat occupant's lumbar region; a guide wire along which the basket glides, the guide wire guiding the basket through what is typically a vertical range of motion; and one or more actuators to cause the basket to flex and, in some embodiments, to move the basket in a vertical direction. The actuators are often coupled to the basket through the use of Bowden-type cables, the shortening of which lead to arching and vertical movement of the basket. In some cases vertical position is adjusted by the use of two opposing cables, one that pulls the basket up and the other that pulls the basket down. In other cases the vertical position is adjusted with a single cable pulling the basket in one direction, with a spring mechanism pulling the basket in the opposite direction upon release of the cable tension, as in the embodiment shown in FIG. 10B.

A thin-seat overmolded lumbar support 20 comprises an overmolded basket 30, a guide wire 40, and one or more Bowden-type cables 50. The underlying overmolded basket 30 is a wire frame 60 comprising a plurality of vertical support wires 70 and at least two transverse wires 80 (FIG. 2), wherein at least the ends of vertical support wires 70 are attached to transverse wires 80. Particularly where there are only two transverse wires 80, one at the top and one at the bottom of wire frame 60, there is a need to maintain vertical support wires 70 in a roughly parallel configuration. This is achieved by overmolding of a plastic support structure 90 onto wire frame 60 to create the overall structure of basket 30. Overmolded plastic support structure 90 contains a plurality of cross-bridges 100, which in a preferred embodiment form a straight line across basket 30 and which keep vertical support wires 70 in a generally parallel orientation relative to one another and create an overall fenestrated appearance. In other embodiments the space between vertical support wires 70 is entirely filled rather than being fenestrated.

It is preferred that the type of plastic to be used for overmolding described herein is a firm, resilient type of plastic, in contrast to soft foam material.

Figure 7A:
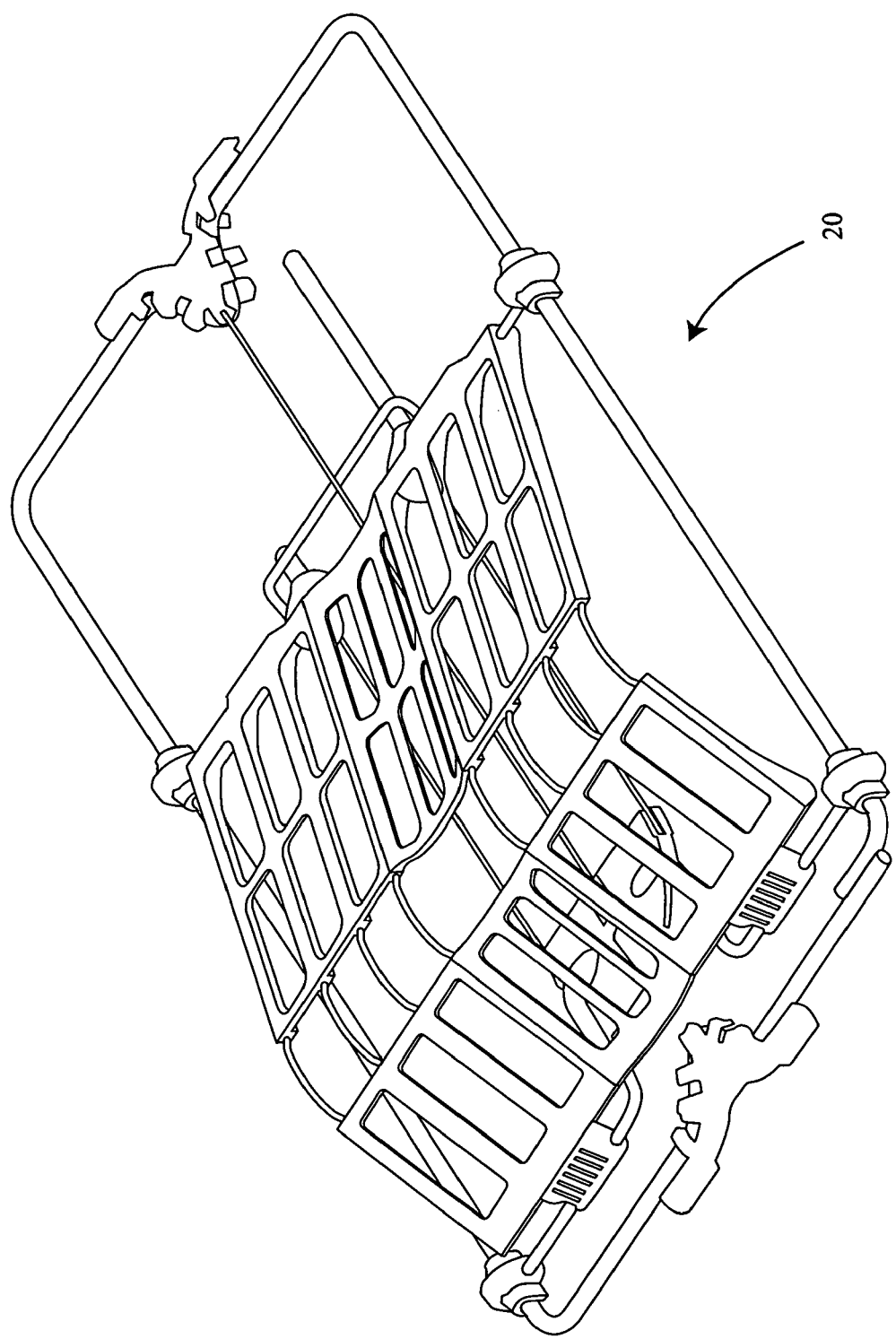
FIG. 7A shows a perspective view from the front of an embodiment of an overmolded lumbar support in the arched position.
Figure 7B:
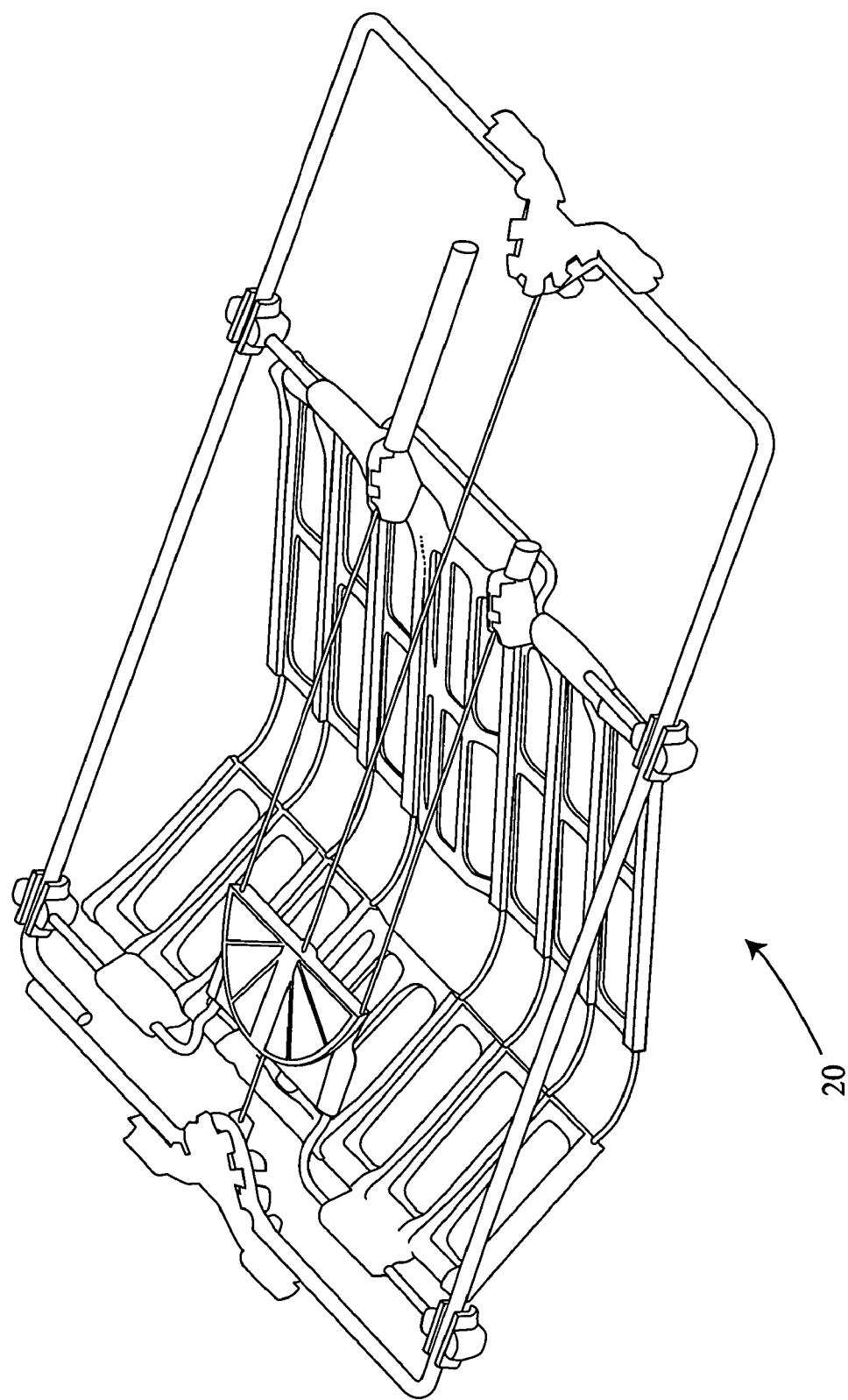
FIG. 7B shows a perspective view from the rear of an embodiment of an overmolded lumbar support in the arched position.

In a preferred embodiment vertical support wires 70 are not overmolded along their entire length but rather there are portions 110 of vertical support wire 70 left without plastic coating. In one embodiment uncoated portion 110 of vertical support wires 70 is in the lumbar region of basket 30. Because overmolded plastic support structure 90 tends to stiffen vertical support wires 70, basket 30 is more likely to flex in uncoated portions 110 when the ends of basket 30 are pulled towards one another. Thus the amount and locations of uncoated wire portions 110 can be adjusted in order to control the degree and location of bending of basket 30 as a whole (FIGS. 7A, 7B).

Figure 2:
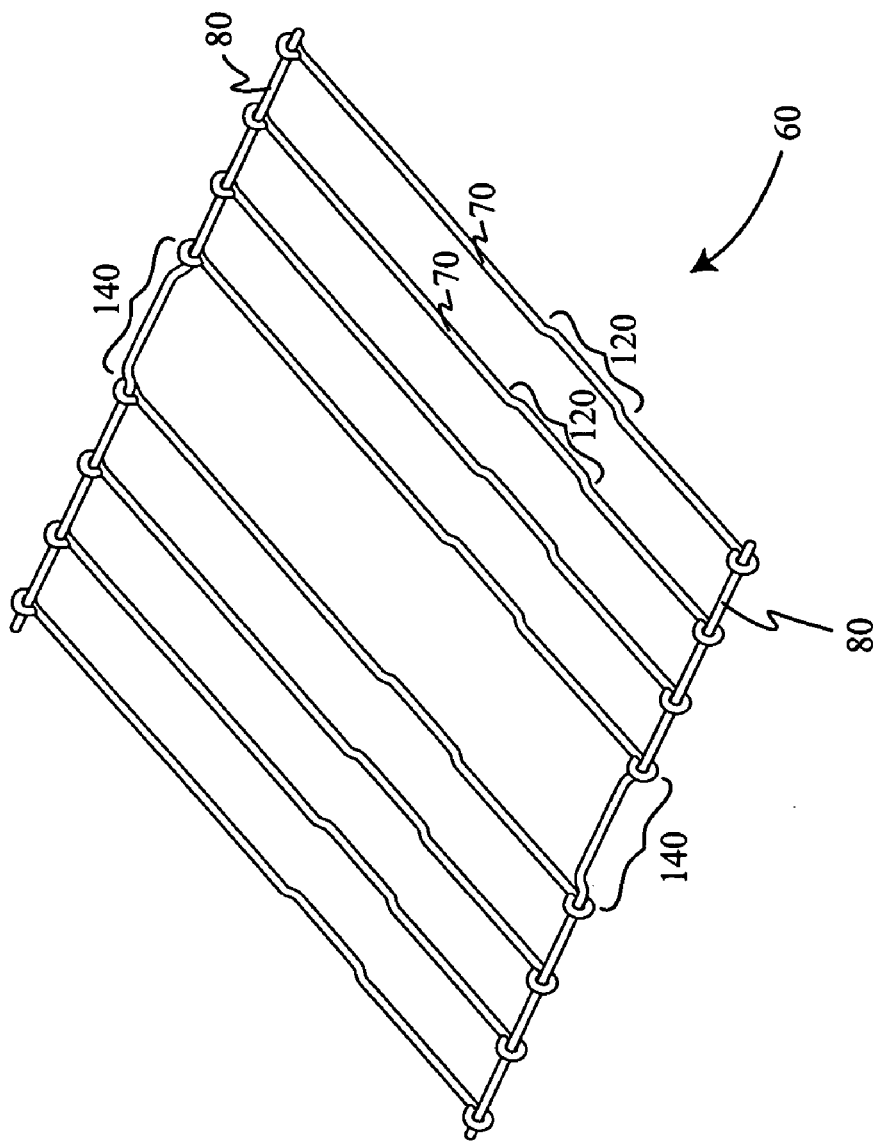
FIG. 2 shows a perspective view of an exemplary embodiment of a wire frame of the type that is overmolded to produce a basket for a thin-seat lumbar.

In one embodiment vertical support wires 70 of wire frame 60 have slight bends 120 in the regions corresponding to places where no plastic is overmolded onto vertical support wires 70 (FIG. 2). In these uncoated portions 110 vertical support wires 70 are bent slightly forward (relative to the seat occupant's back) so that after the plastic is overmolded onto the remaining portions of vertical support wire 70, the coated and uncoated portions will be relatively flush with one another. By making the coated and uncoated regions flush, this improves comfort since there will not be a discontinuity in the support in this region. Also, making these parts relatively flush will lead to less friction and wear on the associated regions of trim when the basket is moved during adjustment and massaging.

In a preferred embodiment wire frame 60 does not contain a wire in the central axis (FIG. 2), since such a centrally-located wire might press against a seat occupant's spine and cause discomfort. Furthermore in one embodiment central portion 130 of the overmolded plastic basket 30 is slightly recessed (FIG. 1A), again to provide greater comfort in the seat occupant's spinal region. When recessed portion 130 is present this further stiffens the overmolded portions of basket 30 against arching or flexing since recessed portion 130 resists bending due to its curved shape. In addition transverse wires 80 preferably contain a bend 140 in the central region between the two innermost vertical support wires (FIG. 2). These bends 140 position the central portion of each transverse wire 80 rearward relative to the seat occupant's back. These centrally-located, rearward bends 140 in transverse wires 80 further contour basket 30 to the seat occupant's spine for greater comfort.

Overmolded basket 30 is made by placing wire frame 60 inside of an appropriately-constructed plastics mold and subsequently injecting a 'shot' of plastic into the mold to encapsulate the metal components at locations determined by the cavities in the mold. Processes for injection molding of plastics, including overmolding of plastics onto metal components, are well known in the art and thus need not be described here in detail. Vertical support wires 70 flex and bend to provide support and massage to the seat occupant, with overmolded plastic support structure 90 serving to control where along their lengths the vertical support wires 70 will bend as well as the degree of bending. Overmolded plastic support structure 90 of basket 30 serves to provide better support to the body of the seat occupant than vertical support wires 70 alone, since plastic ribs 95 and cross-bridges 100 are broader than the underlying segments of wire frame 60. In addition plastic ribs 95 serve to stiffen vertical support wires 70 such that uncoated portions 110 of vertical support wires 70 are more likely to bend and flex when the ends of basket 30 are pulled towards one another, as described above.

Figure 3A:
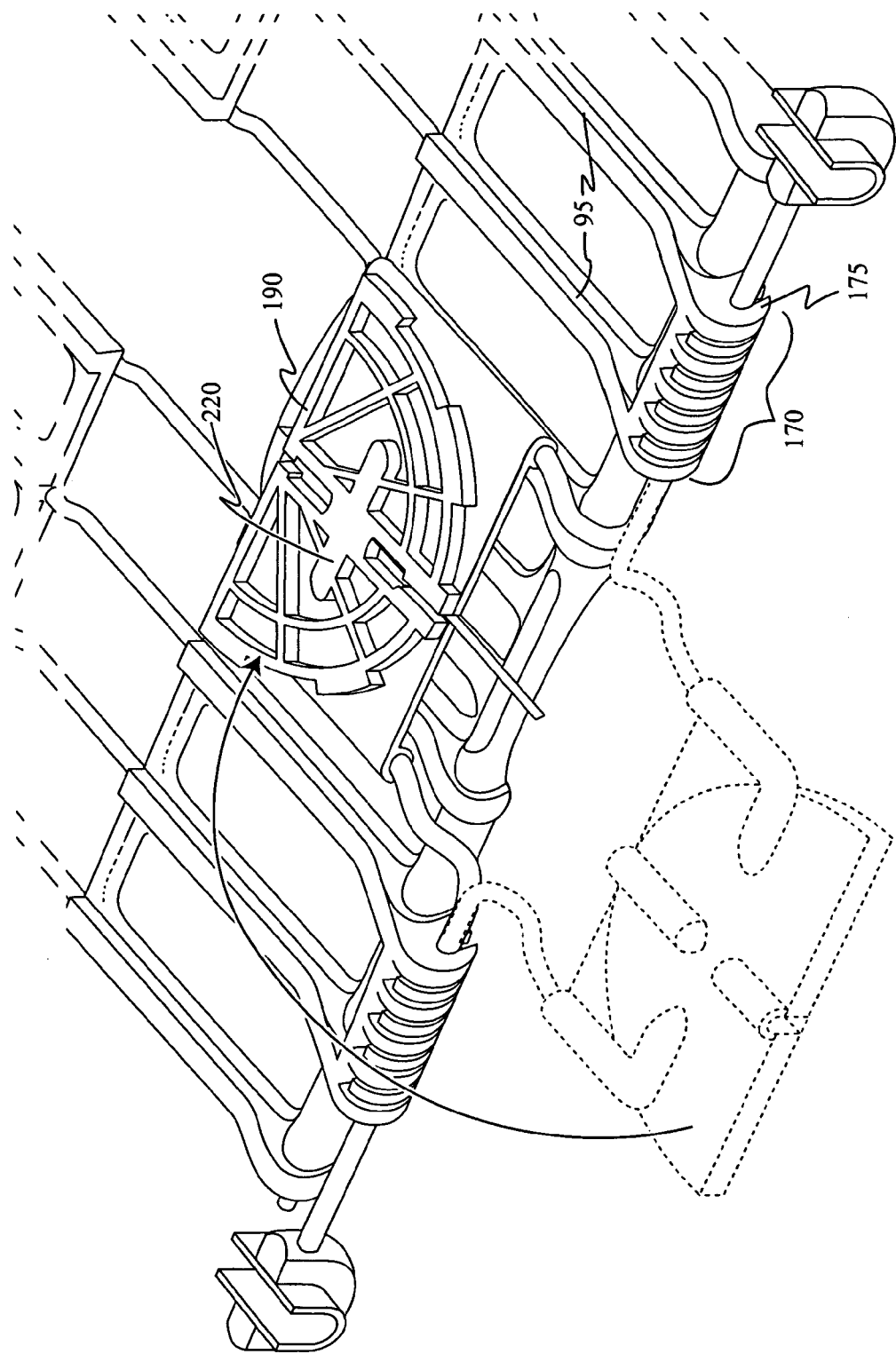
FIG. 3A shows a perspective view of the lower portion of an exemplary embodiment of a thin-seat lumbar support with an overmolded basket, viewed from the rear, i.e. the side opposite the one on which the seat occupant rests, with dashed lines to indicate the position of the pulley during the overmolding process.

One way in which plastic ribs 95 are made to stiffen vertical support wires 70 is by thickening plastic ribs 95 in a direction that is normal to the plane of basket 30. In a preferred embodiment plastic ribs 95 are thicker near the ends of vertical support wires 70, which has the added benefit of strengthening the connection between overmolded plastic support structure 90 of basket 30 and transverse wires 80 of underlying wire frame 60 (FIG. 3A).

In one embodiment basket 30 is removed from its mold and is thereafter assembled with one or more crosswires 150, 160, the crosswires being designed to engage with a guide wire and, in some cases, a pulley 190 for causing arching of basket 30. Crosswires 150, 160 are preferably pivotably engaged with basket 30 so that crosswires 150, 160 can be maintained in a relatively constant orientation while basket 30 is arched. In one embodiment, one or more clip-like structures or clips 172 are molded into basket 30 (FIG. 3C). Crosswires 150, 160 may be attached to these clips 172 either before crosswires 150, 160 are placed into the mold or after basket 30 is ejected from the mold. Clips 172 are preferably made of metal. Metal clips 172 may be attached to transverse wires 80 before overmolding in order to anchor metal clips 172 to basket 30, or metal clips 172 may simply be anchored to basket 30 by the interaction of metal clips 172 with the overmolded plastic.

Figure 1B:
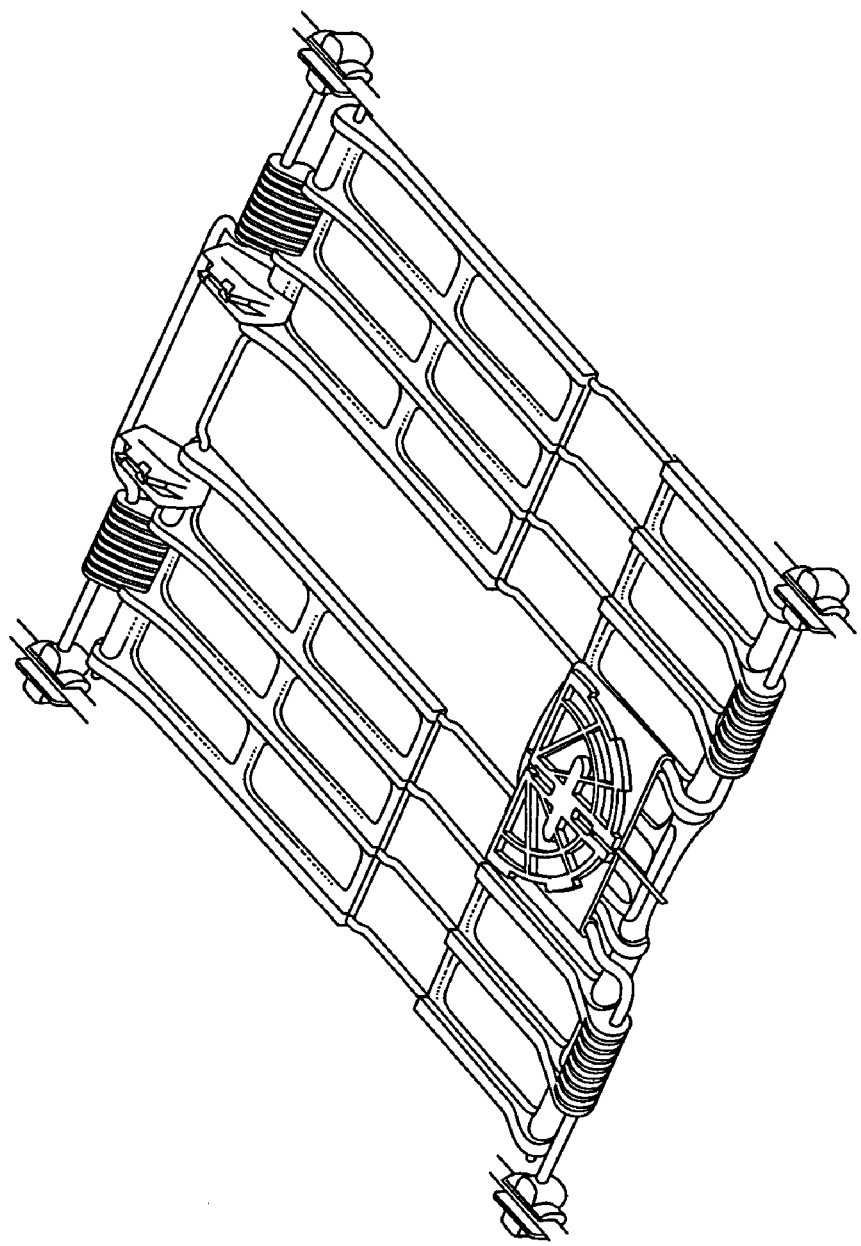
FIG. 1B shows a perspective view, from the back side, of a lumbar basket with integrally-molded crosswires.

In yet another embodiment, in addition to wire frame 60 two horizontal crosswires 150, 160 are also placed into the plastics mold prior to overmolding of basket structure 30 (FIGS. 1A, 1B). Crosswires 150, 160 are held onto the main body of basket 30 by clips 170 integrally molded into basket 30. In one embodiment overmolded clips 170 consist of a series of interleaved, opposing fingers 175 that wrap partway around crosswires 150, 160 (FIG. 3A). Fingers 175 are preferably not attached to one another, so that as the injected plastic cools, fingers 175 undergo shrinkage. However, due to the fact that the interleaved fingers 175 are not attached to one another, as each finger 175 shrinks it retracts slightly from crosswire 150, 160 and thus does not tightly bind to crosswire 150, 160. Therefore crosswire 150, 160 is allowed to rotate freely relative to overmolded clip 170 and thus relative to basket 30 as a whole. This rotational movement is critical for optimizing the flexing movements that occur during adjustment of lumbar support 20 and during massaging action of lumbar 20. Fingers 175 are mainly under compressive force, since in use crosswires 150, 160 are pulled towards one another, and therefore fingers 175 can be made entirely of plastic without a requirement for wire or other metal inserts to strengthen fingers 175. Fingers 175 or other types of overmolded clips 170 are preferably strengthened by including gussets attached to basket 30 and to clip 170 or by generally thickening clips 170 in a direction that is perpendicular to the long axis of crosswire 150, 160.

More generally the requirements for integral, overmolded clips 170 that join crosswires 150, 160 to basket 30 are that overmolded clips 170 must securely hold crosswire 150, 160 while still allowing rotational movement of crosswires 150, 160 relative to overmolded clips 170. In addition clips 170 must be strong enough to withstand the repeated compressive forces that occur as a result of adjustment of basket 30 and use of lumbar 20 to produce a massaging action. Generally overmolded clips 170 consist of separate pieces of material that partially surround crosswires 150, 160 from each side (FIGS. 3A, 3F, and 3G), although embodiments wherein the plastic completely surrounds the crosswires are workable and are encompassed within the present invention (FIGS. 3D, 3E).

These latter embodiments (FIG. 3D) are workable if crosswires 150, 160 are rotated several times (approximately five) shortly after removal from the mold, to free up any bonds that may have formed between the metal crosswires and the surrounding plastic. Although crosswires 150, 160 are not as loose in this embodiment compared to others, it is nonetheless a workable solution and is encompassed within the scope of the invention.

Figure 3B:
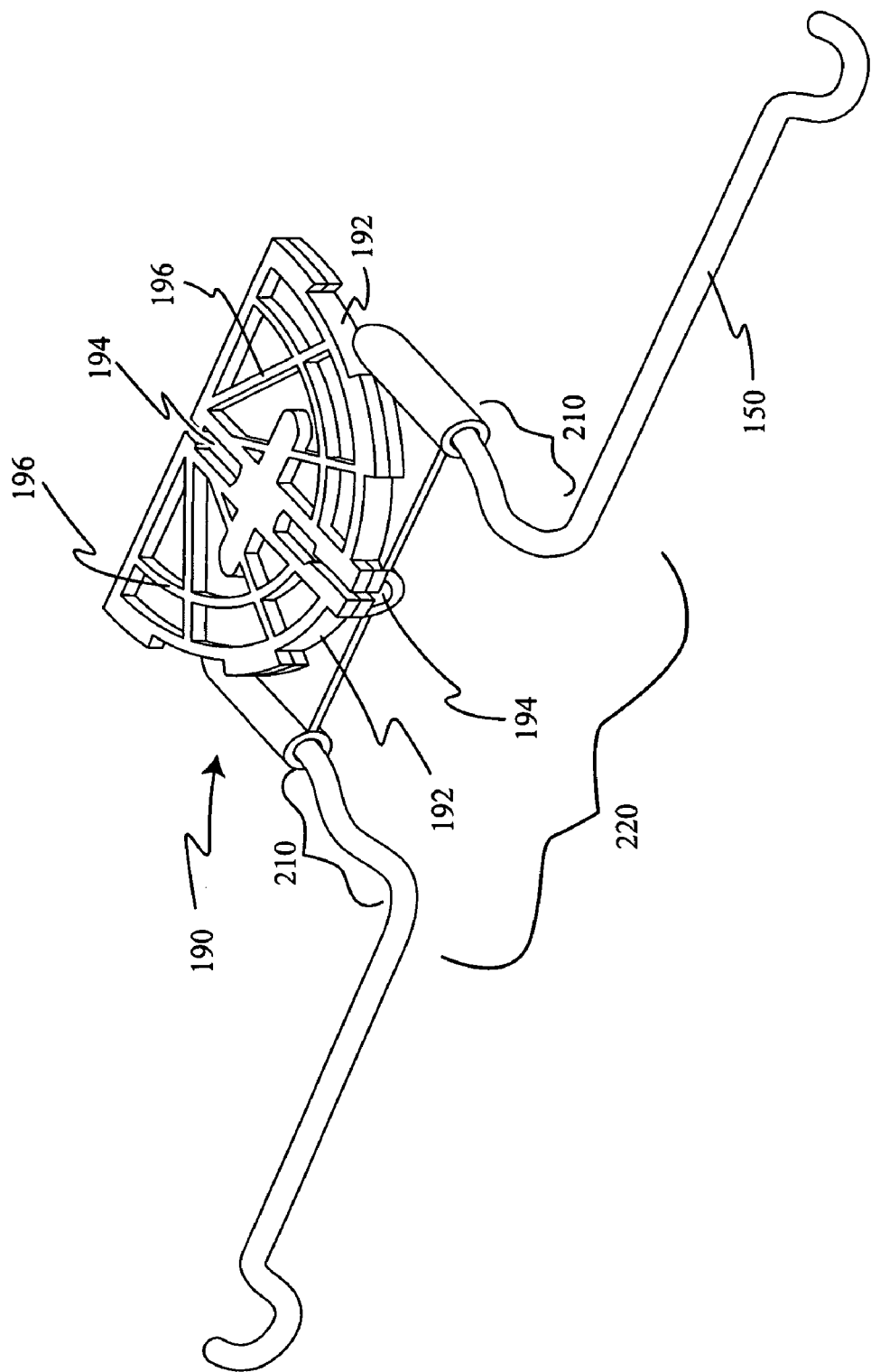
FIG. 3B shows one embodiment of the lower crosswire with a pulley overmolded onto it.
Figure 3C:
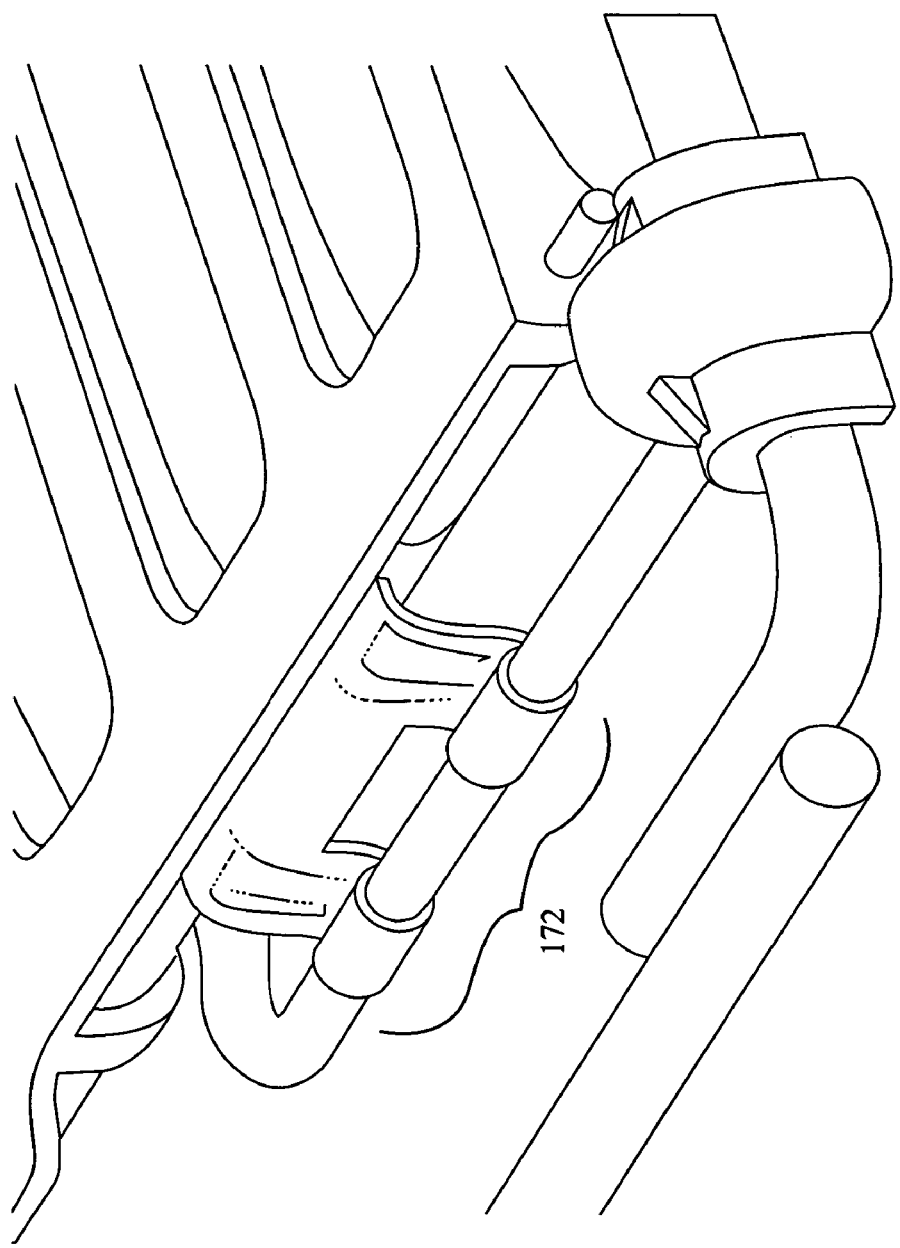
FIG. 3C shows an embodiment of a basket wherein a metal clip is overmolded along with the basket and the crosswire is attached to the clip after molding.
Figure 3D:
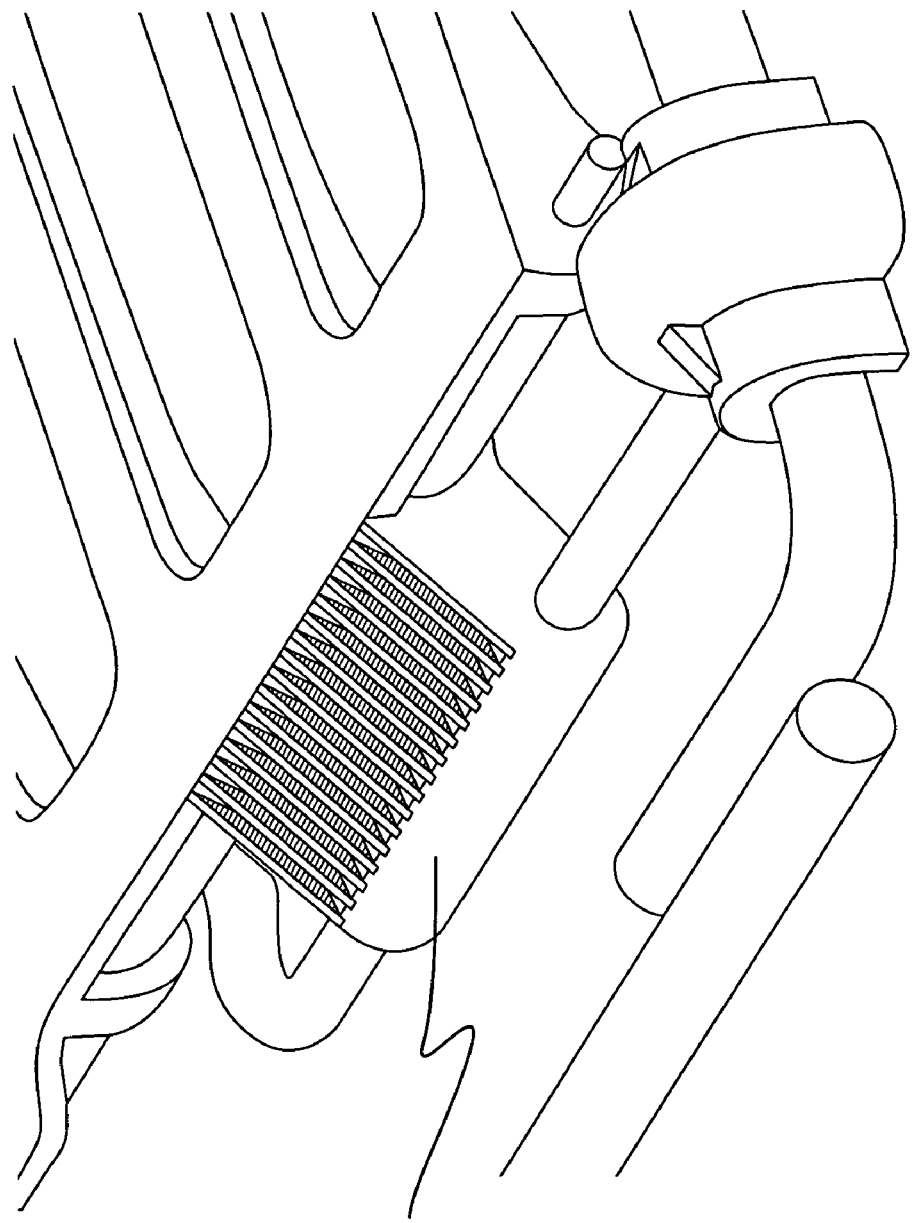
FIGS. 3D, 3E, 3F, and 3G show alternative embodiments of the overmolded clip design attached to the guide wire.
Figure 3E:
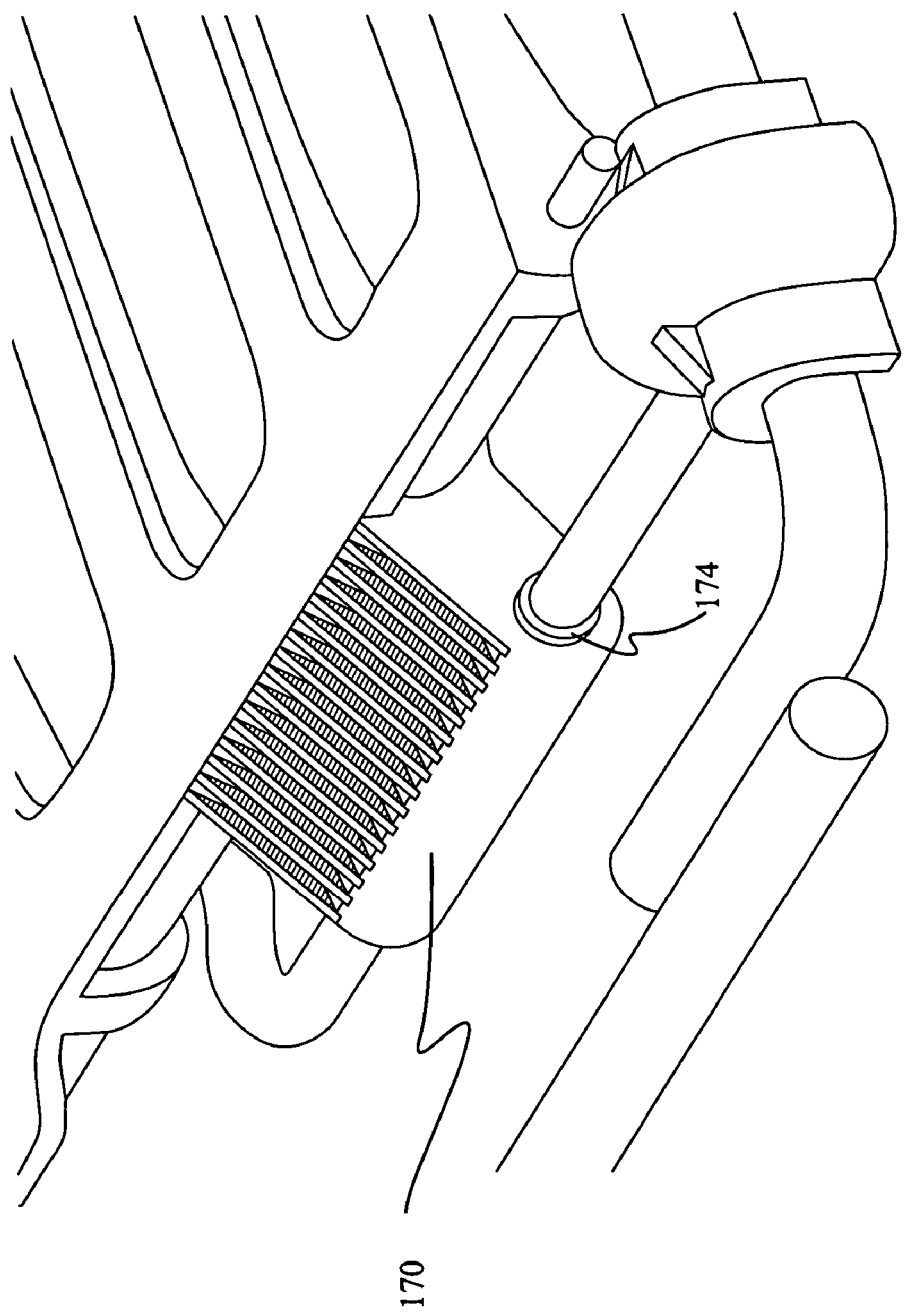

In an alternative embodiment wherein plastic overmolded clips 170 completely surround crosswires 150, 160 the connection is made more flexible by insertion of loosely-fitting plastic or metal sleeves 174 over crosswires 150, 160 prior to overmolding of clips 170, so that sleeves 174 are disposed between crosswires 150, 160 and overmolded clips 170 (FIG. 3E). Sleeves 174 prevent clips 170 from shrinking around crosswires and thus allow movement of crosswires 150, 160 relative to clips 170.

Figure 3F:
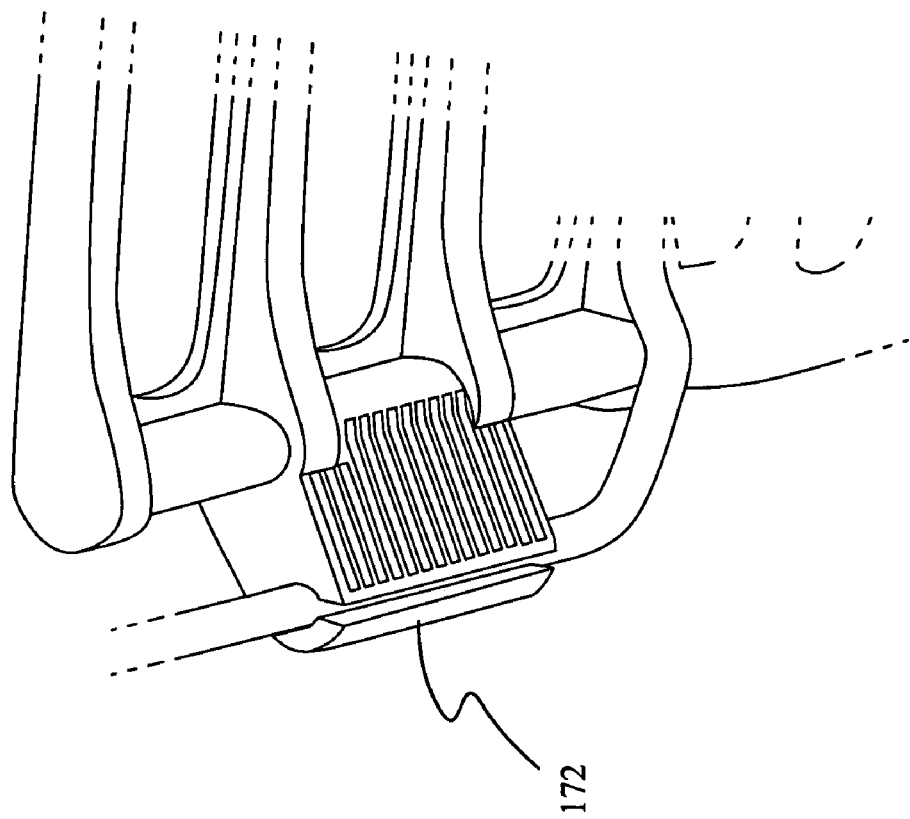
Figure 3G:
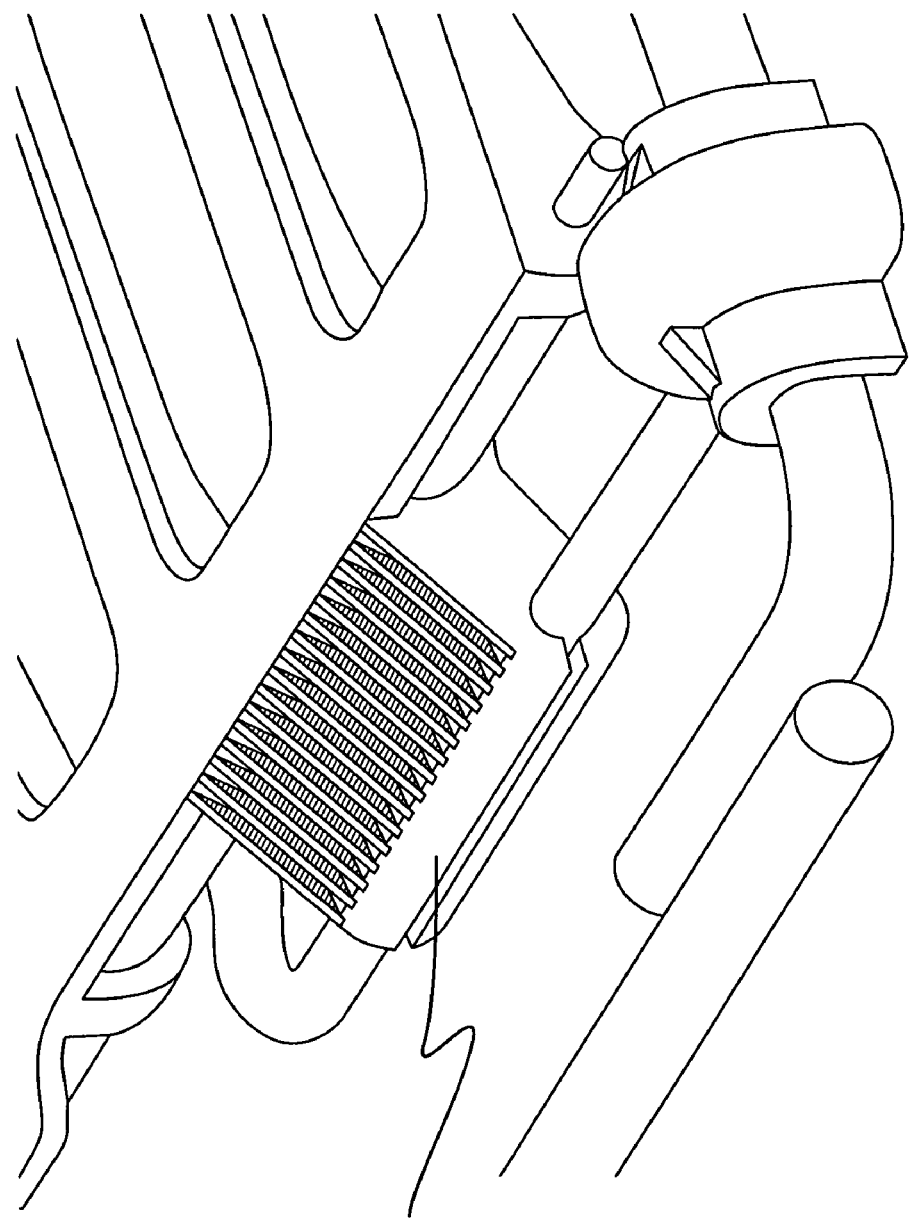

If there is in fact a gap between the two halves of an overmolded clip then as the plastic cools and shrinks it will pull slightly away from crosswires 150, 160. Therefore in some embodiments the separate pieces of material that surround crosswires 150, 160 from each side do not join one another (FIGS. 3A, 3F, and 3G). As described above, a preferred embodiment for overmolded clips 170 is to have a series of opposing, interleaved fingerlike structures, wherein none of fingers 175 completely surrounds crosswire 150, 160 and wherein fingers 175 are not joined to one another. In an alternative embodiment overmolded clip 170 consists of a tube that surrounds crosswire 150, 160 except for an open slit running the length of overmolded clip 170 (FIGS. 3F and 3G).

Overmolded clips 170 preferably hold crosswires 150, 160 at a position that is behind (relative to the seat occupant) basket 30, so that when one or the other of crosswire 150, 160 is pulled by a Bowden cable 50 there is a bias towards forward flexing of basket 30.

At the ends of crosswires 150, 160 are plastic sliders 180 that are preferably overmolded onto the ends of crosswires 150, 160 in the same operation that overmolds the other parts of basket 30. Sliders 180 are placed onto the appropriate segments of guide wire 40 during assembly, and in use sliders 180 slide along guide wire 40. The ends of crosswires 150, 160 are preferably bent in a shape approximating that of overmolded plastic sliders 180 in order to strengthen sliders 180 as well as to keep sliders 180 more firmly attached to crosswires 150, 160, since the overmolded plastic is far less likely to slip off a bent wire than a straight wire. Sliders 180 tend to remain engaged with guide wire 40 because of the backward (relative to the seat occupant) pulling of the Bowden cable(s) attached to guide wire 40 and also because of the presence of trim material and other seat structures that limit the forward range of motion of basket 30 relative to guide wire 40.

Also overmolded onto at least one of crosswires 150, 160 is a pulley 190. In operation, pulley 190 is in a position that overlaps parts of the plastic portions of basket 30, which would be difficult or impossible to produce by injection molding while in that position. To overcome this difficulty crosswire 150 is rotated 180 degrees from its operating position for molding purposes, into the position shown with dashed lines in FIG. 3A. Thus pulley 190 is overmolded while it is extending outside of the region of basket 30 defined by wire frame 60. After ejecting basket 30 from the injection mold, pulley 190 is flipped approximately 180 degrees towards and finally behind basket 30 (see curved arrow in FIG. 3A).

Crosswire 150, to which pulley 190 is attached, preferably has an approximately square C-shaped bend 200 in the central portion to strengthen the connection between pulley 190 and crosswire 150 (FIG. 3B). Bent portion 200 of crosswire 150 is encapsulated approximately in the middle of pulley 190 as a result of the overmolding process. Bent portion 200 of crosswire 150 also preferably has additional bends 210 that position pulley 190 in a plane that is parallel to but slightly behind that of basket 30, so that the cables attached to pulley 190 do not rub against basket 30 when basket 30 is in the unflexed position. In addition, the lateral portions of C-shaped portion 200 of crosswire 150 bend forward to accommodate the hemispherical pulley track and the cable associated therewith. Finally, a central portion 220 of C-shaped segment 200 has bends that position central portion 220 further backwards than the adjoining segments of crosswire 150 in order to accommodate central recessed portion 130 of basket 30, when this feature is present.

Crosswire 160 also contains bends, in this case to keep this segment of crosswire 160 out of the path of Bowden cable 50 that is directly attached to basket 30 and which causes flexing of basket 30.

At this point overmolded basket 30 is assembled onto guide wire 40 by guiding the aforementioned sliders 180 onto the appropriate sections of guide wire 40. As stated previously, sliders 180 slide along side segments 42 of guide wire 40 to permit basket 30 to bend and to be vertically adjusted. To allow this movement, which may be regularly repeated to achieve a massaging action, without wearing down the plastic portions of sliders 180, guide wire 40 is preferably relatively smooth.

Figure 4:
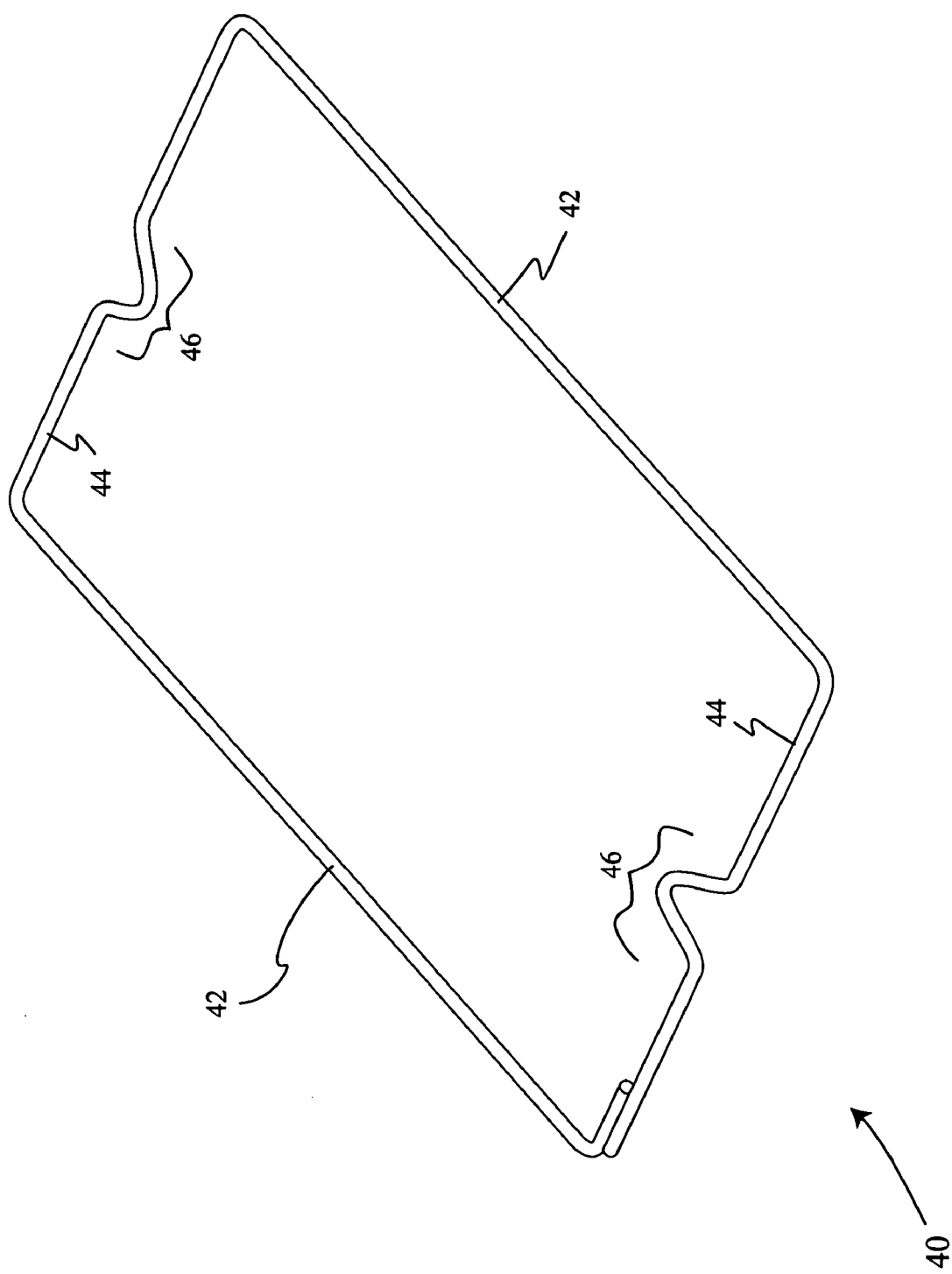
FIG. 4 shows a perspective view of one embodiment of a guide wire for use in a thin-seat lumbar.

In one embodiment guide wire 40 is an approximately rectangular structure made of relatively stiff wire, the rectangle having two approximately parallel side segments 42 and two approximately parallel end segments 44 (FIG. 4). Guide wire 40 is approximately rounded at the corners and end segments 44 preferably have approximately V-shaped bends 46 to accommodate a cable routing piece 230 (FIG. 1A), although other shapes that accommodate cable routing piece 230 are also possible. Guide wire 40 in one embodiment is made by bending a single piece of wire in the desired shape and then attaching the two ends of the wire to one another, which in one embodiment entails overlapping the ends and welding the overlapped portions together (FIG. 4). Guide wire 40 should be made of wire that is stiff enough to resist significant bending under the forces required to flex basket 30 and maintain an arched shape even while the seat occupant rests on lumbar support 20.

V-shaped bends 46 are slightly bent out of the plane defined by the rest of guide wire 40 so that the vertices of V-shaped bends 46 are slightly behind (relative to the seat occupant's back) the plane defined by guide wire 40 (FIG. 4). By bending V-shaped bends 46 in this way a Bowden cable wire 238 that is run through cable routing pieces 230 will run in a plane that is approximately parallel to but behind the plane of basket 30, to prevent Bowden cable wire 238 from rubbing against or catching on basket 30.

Figure 5:
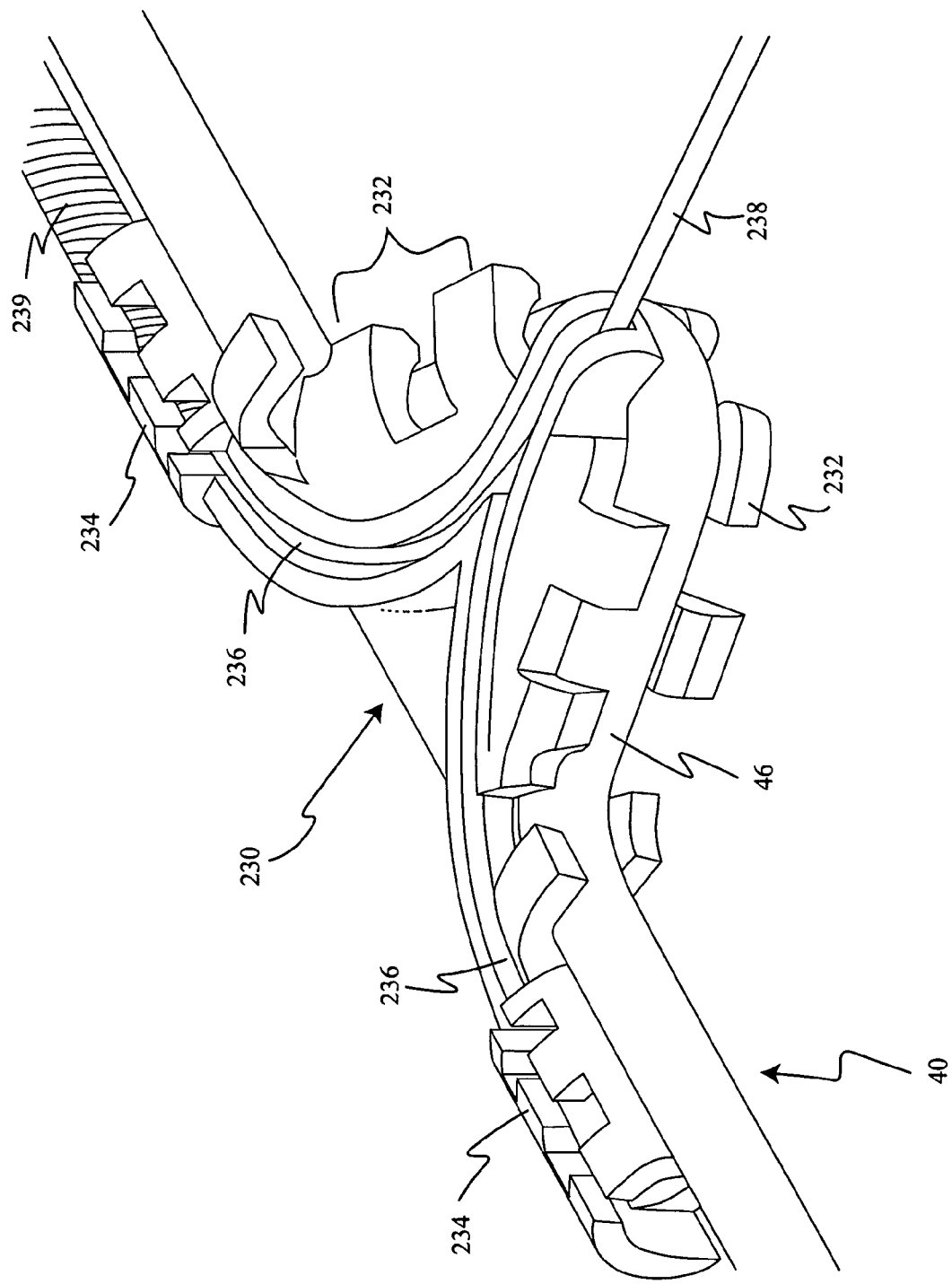
FIG. 5 shows a perspective view of one embodiment of a cable routing piece attached to a guide wire, with a cable extending from the cable routing piece.

Cable routing pieces 230 are preferably made separately from basket 30 and guide wire 40 and are assembled onto guide wire 40, preferably by providing cable routing piece 230 with opposing fingers 232 that engage with guide wire 40 by snapping into place (FIG. 5). In a preferred embodiment opposing fingers 232 alternate so that they are not directly across from one another. Cable routing piece 230 has two opposing receiving bushings 234 for engaging a sleeve of a Bowden-type cable. By having two opposing bushings 234 cable routing piece 230 may be used for bringing in a Bowden cable from either side of lumbar support 20, thus allowing greater flexibility and eliminating the need for stocking separate left- and right-hand pieces. Furthermore, by having a Bowden cable sleeve 239 enter from the side this reduces the overall height requirement for lumbar support 20 when it is installed.

Axially aligned with the sleeve-receiving bushings 234 are two preferably symmetrical channels 236 for guiding Bowden cable wire 238 through a turn of preferably ninety degrees (FIG. 5). Channels 236 have a sufficiently large angle of curvature to minimize friction and binding of Bowden cable wire 238 running therethrough, which in turn improves performance and longevity of the system. The two laterally-disposed channels 236 converge near the center of cable routing piece 230. Cable routing pieces 230 are preferably interchangeable between the two end segments of guide wire 40, thus V-shaped bends 46 at either end of guide wire 40 should be approximately the same shape to allow cable routing piece 230 to snap into place. Sleeve-receiving bushings 234 and channels 236 preferably are slotted on one side to allow Bowden cable wire 238 to be inserted directly into channel 236 without a need to thread wire 238 through a hole, thereby making assembly faster and less costly. In addition, this also allows feeding through of wire 238 having an attachment such as a so-called 'bullet' at the end (i.e. a hook or protrusion molded onto the end of the wire which allows stable attachment of the wire onto other structures), particularly in the case where the bullet is substantially larger than the wire diameter and which therefore would not fit through an approximately wire-sized hole.

In addition, by having cable routing piece 230 guide Bowden cable wire 238 through the 90° turn, this better controls the change in orientation of wire 238 from horizontal to vertical by having a fixed radius of curvature. In contrast, if wire 238 were to make this transition while inside Bowden cable sleeve 239, the flexibility of sleeve 239 can lead to varying radii of curvature for the turn, leading to variable performance of the system.

Pulley 190, which is rotated into place following molding, has an approximately hemispherical channel or track 192 for smoothly guiding a Bowden cable wire (FIG. 3B). Track 192 is preferably open or slotted on its outside edge to allow easy assembly of a wire onto track 192, especially when the wire has a bullet or other piece attached to the end. Pulley 190 also has at least one bushing 194 for engaging the end of a Bowden cable. In one embodiment bushing(s) 194 are axially aligned. In another embodiment there are two collinear bushings 194 for engaging the ends of collinear Bowden cables that are attached at opposite ends of guide wire 40. In one embodiment the encapsulated crosswire 150 runs between bushings 194, in order to keep the overall profile of pulley 190 as slim as possible and to accommodate central recessed portion 130 of basket 30, when present. In a preferred embodiment bushings 194 have open slots that allow insertion of a wire end that has a bullet attached thereto, which eliminates the need for threading the wire through a hole and therefore allows easier assembly. Pulley 190 is largely hollow but is strengthened with a series of gussets or ribs 196 extending generally perpendicular to the plane of pulley 190.

Figure 6:
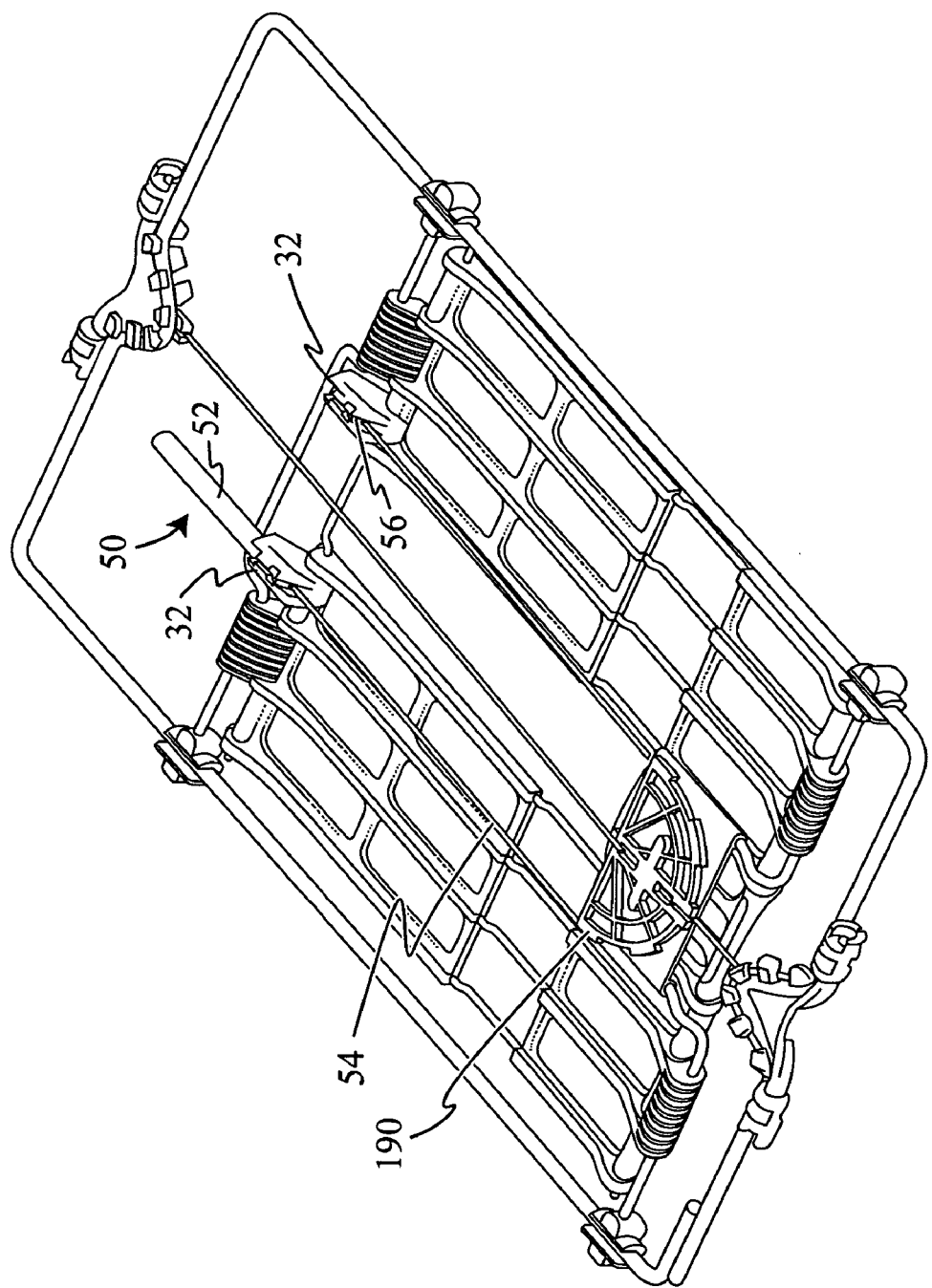
FIG. 6 shows a perspective view of the backside of one embodiment of a thin-seat lumbar support.

Basket 30 also has molded into it a pair of preferably laterally-positioned bushings 32 for engaging Bowden cable 50 which, when pulled tight, will cause basket 30 to arch and flex (FIG. 6). Bushings 32 are constructed so that each one can engage either a Bowden cable sleeve 52 or a bullet 56. Bowden cable sleeve 52 is attached to bushing 32 after overmolded basket 30 is ejected from its mold. Bowden cable sleeve 52 is engaged in one bushing 32, Bowden cable wire 54 is routed through hemispherical track 192 of pulley 190 and the distal end of wire 54 is attached to the opposite bushing 32 on basket 30, preferably by engaging bullet 56 with bushing 32. Again bushings 32 are constructed with open slots so as to allow wire 54 to be inserted into bushings 32 without a need for threading wire 54 through a hole. As with cable routing piece 230, bushings 32 on basket 30 are symmetrical, thereby allowing Bowden cable 50 to be attached on either the left or right side using a single type of basket 30.

Bushings 32 are molded onto basket 30 so that attached Bowden cable 50 runs parallel to but behind the plane of basket 30. Bushings 32 are designed to firmly engage bullet 56 and Bowden cable sleeve 52 not just in the axial direction but from other directions as well, since as basket 30 flexes Bowden cable wire 54 will remain parallel to the plane of the unflexed basket 30 while the end of basket 30 and bushings 32 attached thereto will rotate with the flexing basket 30. As bushings 32 rotate, Bowden cable wire 54 will pull on cable sleeve 52 or bullet 56 from varying angles, thus requiring bushings 32 to hold these pieces firmly from different angles. Another advantage of having basket-molded bushings 32 positioned behind the plane of basket 30 is that when the attached Bowden cable wire 54 is pulled taut this creates torque that tends to bias basket 30 to flex forward. Without this bias in favor of forward movement, pulling together the ends of unflexed basket 30 could at times lead to backward flexing of basket 30.

To assemble a lumbar flex-actuating cable onto basket 30, sleeve 52 of Bowden cable 50 is engaged with one of bushings 32 that is molded into basket 30 (FIG. 6). Bowden cable wire 54 is then wrapped around pulley 190 and the distal end of wire 54 is engaged with the other basket-molded bushing 32, preferably by bullet 56 attached to the distal end of wire 54.

When Bowden cable 50 attached to basket 30 is shortened relative to sleeve 52, basket 30 arches (FIGS. 7A, 7B). During flexing of basket 30 the plane of pulley 190 continues to be substantially collinear with wire 54 of Bowden cable 50 because of the pivoting attachment of crosswire 150 to basket 30. When either of the axially-aligned Bowden cable wires 238, 238A (i.e. those mounted onto the end segments 44 of guide wire 40) is shortened, basket 30 is drawn one way or the other in a longitudinal direction, generally up or down. In an alternative embodiment a single axial cable 238 mounted to guide wire 40 is used to generate vertical movement of the arched basket 30, with cable 238 pulling in one direction when it is shortened and one or more springs attached to basket 30 and guide wire 40 pulling basket 30 in the opposite direction when cable 238 is lengthened (not shown).

Figure 10A:
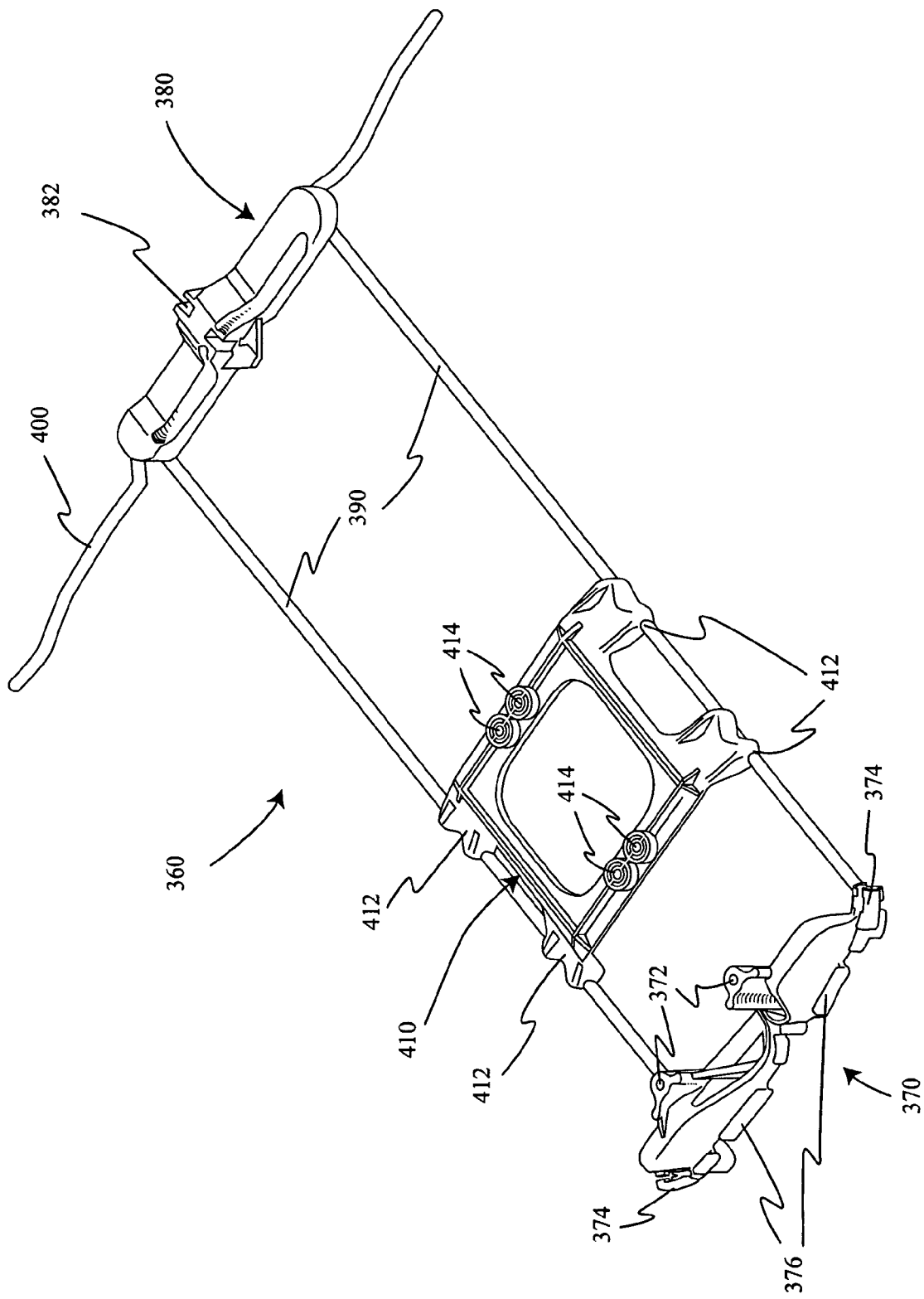
FIG. 10A shows an embodiment of a guide wire assembly produced by an overmolding process, showing the guide wire alone.
Figure 10B:
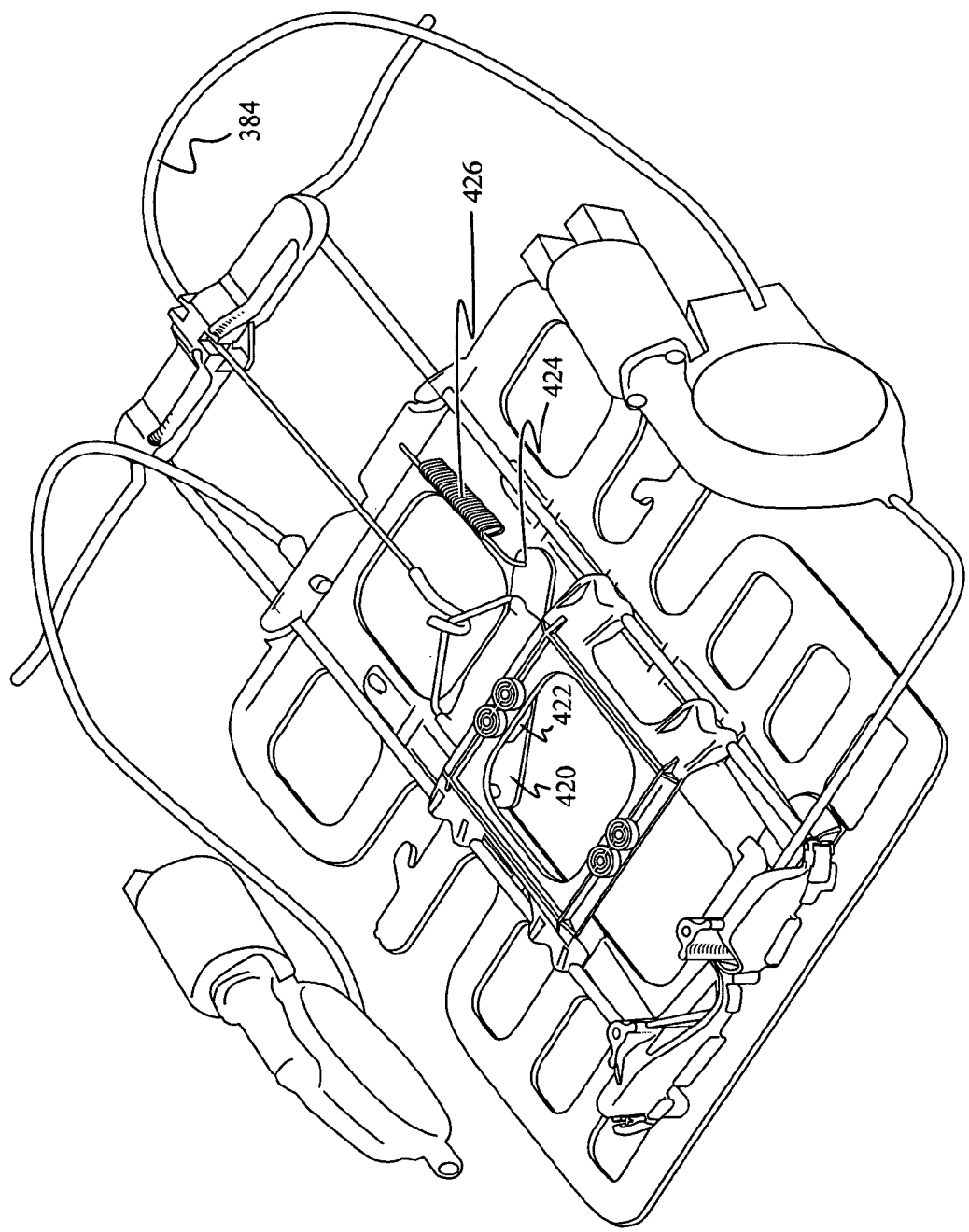
FIG. 10B shows an embodiment of a guide wire assembly produced by an overmolding process, showing the guide wire as assembled into a lumbar support.

In yet another embodiment Bowden cable wire 238 is attached to a lever 420 that is pivotably attached at a point near the center 422 of lever (FIG. 10B). The opposite end of lever 424 is attached to one end of a spring 426 while the other end of spring 426 is attached to the same end of basket 30 as Bowden cable sleeve 239.

With use of either a lever or a pulley to generate the force required for arching of basket 30, this allows pressure to be evenly applied to both sides of basket 30 while leaving the central portion open for an air duct (FIG. 10B).

The vertical movement of basket 30, along with arching, is used to optimize the feel of lumbar support 20 for each individual seat occupant depending on the occupant's preferences and body size. In addition, these movements are performed dynamically by an automated system to give the seat occupant a '4-way' massage, moving basket 30 up and down as well as into and out of the seat occupant's lower back.

Figure 8:
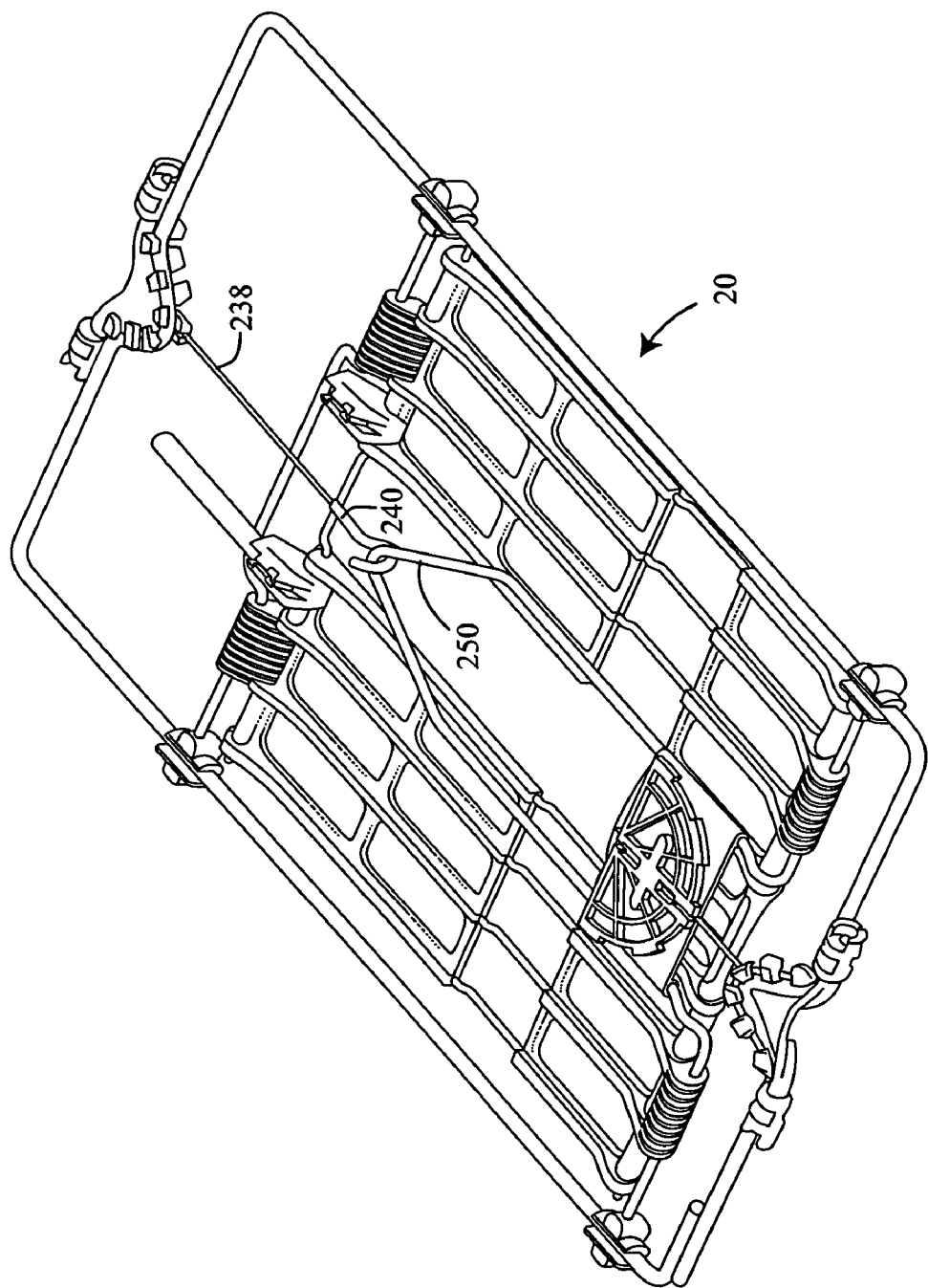
FIG. 8 shows an embodiment of a thin-seat lumbar, viewed from the back side, designed to accommodate a central air duct in the seat, having an open central portion of the basket and a split wire attached to the pulley.

In some embodiments it is desirable to leave the central, axial portion of basket 30 open, for example to allow for an air duct for seat ventilation (FIG. 8). To prevent possible obstruction of the air duct by axially positioned Bowden cable wire 238, an alternative 'split wire' arrangement is used. In this embodiment, axial Bowden cable wire 238 has a hook 240 at its end, with hook 240 attaching to a splitter 250. Splitter 250 in one embodiment is a single piece of relatively stiff wire that is bent over in a modified V-shape. Splitter 250 attaches to hook 240 at its bent end, expands to a width comparable to that of pulley 190, and is then attached to pulley 190 at its two free ends. In a preferred embodiment splitter 250 is overmolded into pulley 190 along with crosswire 150. In another embodiment splitter 250 is merely an extension of crosswire 150 and again is overmolded into pulley 190.

Figure 1C:
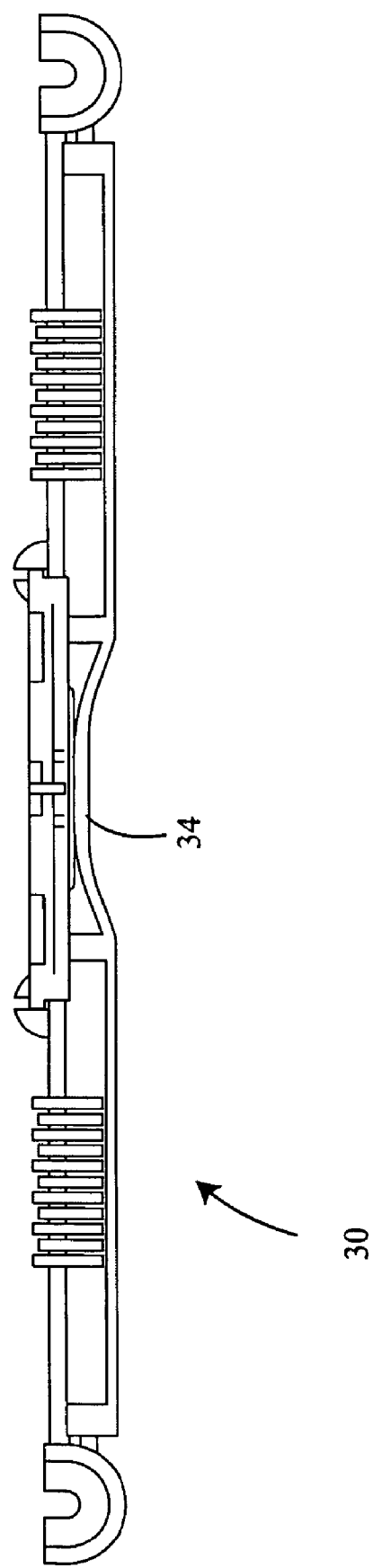
FIG. 1C shows an edge view from the top of a preferred embodiment of a lumbar basket with attached crosswires.

The overmolding of plastic onto wire frame 60, along with situating guide wire 40 outside of the region of basket 30, allows the overall thickness of lumbar support 20 to be minimized. In one embodiment the thickness of basket 30 is reduced to ten to fifteen millimeters in a central region 34, excluding crosswires 150, 160 and pulley 190 (FIG. 1C). In order to reduce overlap of the various parts of lumbar support 20 and thus allow a thinner overall profile, guide wire 40 in a preferred embodiment of a thin-seat lumbar is enlarged so that it is situated outside of the region of basket 30, as shown. To be able to engage with this larger guide wire 40, crosswires 150, 160 in this embodiment include bends at their ends onto which sliders 180 are overmolded, sliders 180 slidably engaging vertical side segments 42 of guide wire 40.

In some embodiments the guide wire, rather than or in addition to the basket, is overmolded to create various attachments. If the basket has not already been incorporated into the design it is then attached to the guide wire after the overmolding step is complete.

Figure 9:
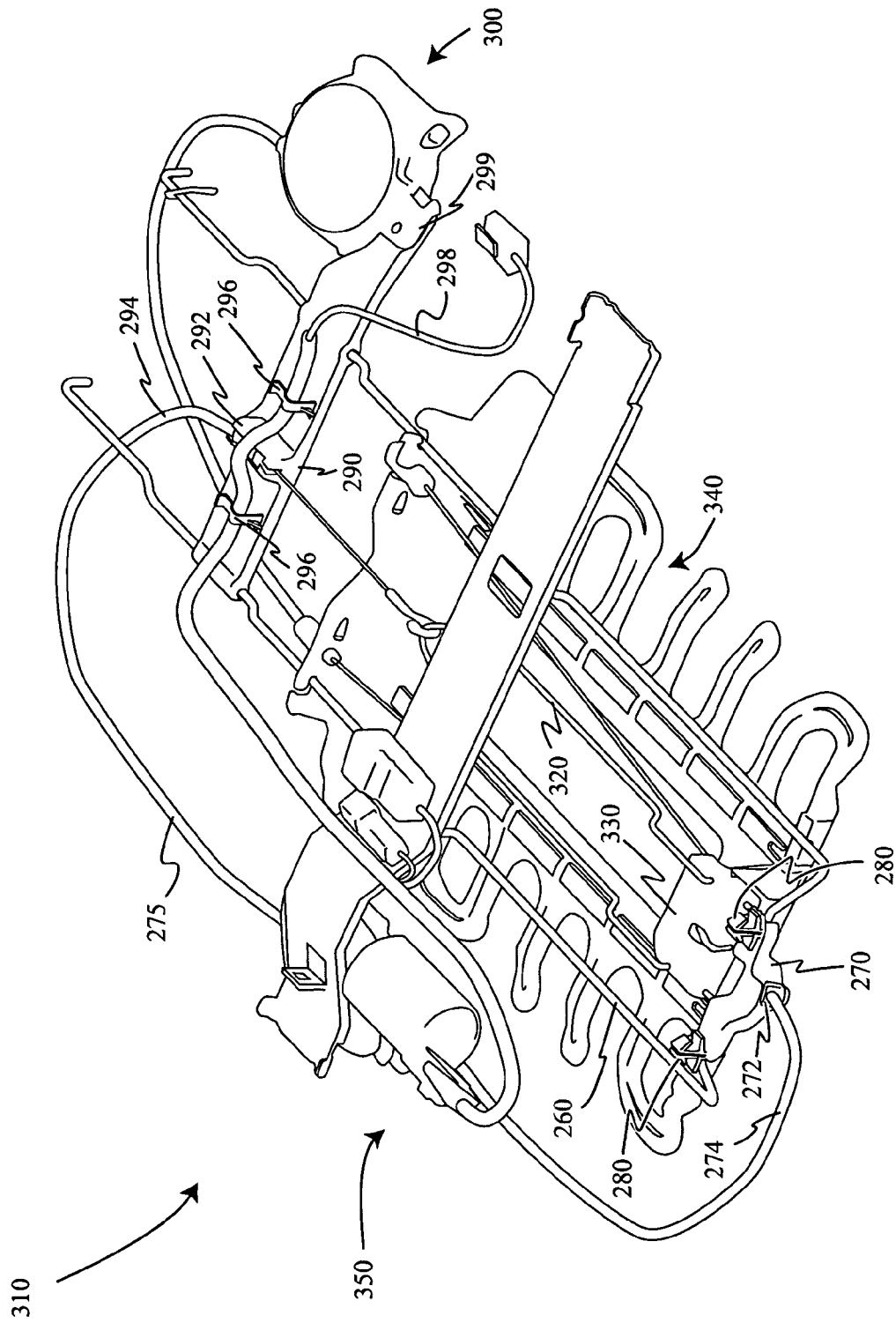
FIG. 9 shows an embodiment of a guide wire assembly produced by an overmolding process, showing the guide wire assembled into a lumbar support.

In one such embodiment of a lumbar support 310 one end of a guide wire 260 is overmolded to create a bracket 270 that has a bushing 272 for a Bowden cable 274 as well as two clips 280 for attaching guide wire 260 onto a seat frame (FIG. 9).

Near the other end a second bracket 290 is overmolded onto guide wire 260, second bracket 290 having a bushing 292 for a Bowden cable 294, two clips 296 for attachment of a power cable 298, and an attachment point 299 for a cable actuator 300.

One embodiment of lumbar support 310 employs a split wire 320 attached to a pulley 330. Split wire 320 is joined to pulley 330 by overmolding, or alternatively pulley 330 is cast with slots on its sides into which split wire 320 is snapped during assembly. In an embodiment of lumbar support 310, split wire 320 is made or assembled with pulley 330 separately from the other parts. Guide wire 260 is overmolded with one or more brackets as needed. Finally, guide wire 260, split wire 320, a basket 340, and various Bowden cables 274, 275, 302 and their associated actuators 300, 350 and power cables 298 are assembled together to produce lumbar support 310 (FIG. 9).

Figure 10C:
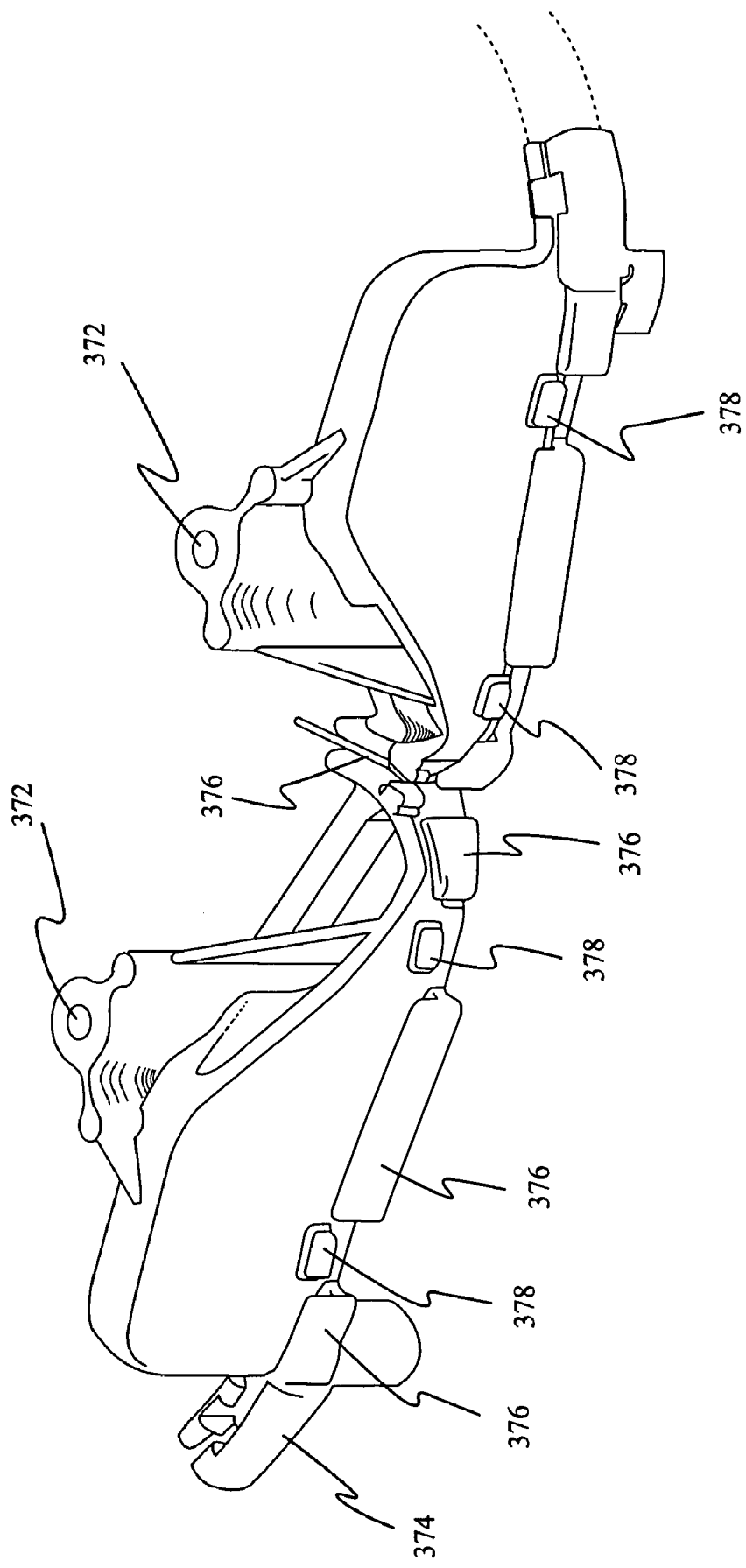
FIG. 10C shows an embodiment of a bracket for attaching a cable to a lumbar support device.

In another embodiment of a guide wire 360 one end of guide wire 360 is overmolded to produce a bracket 370 having tapped holes 372 for fasteners for attachment of guide wire 360 to a seat frame (FIG. 10A). In addition bracket 370 has two symmetrically-placed bushings 374 for attachment of a Bowden cable sleeve and axially aligned, collinear guide tracks 376 for guiding a Bowden cable wire through an approximately 90 degree turn from a side of guide wire 360 to the central axis. Since bracket 370 has symmetrically-placed bushings 374 and guide tracks 376, this permits attachment of a Bowden cable from either side of the lumbar support using a single guide wire 360, eliminating the need to stock separate left- and right-handed parts. The integral guide tracks 376 maximize the turning radius and keep this turn in a constant shape, which enhances performance and longevity of the lumbar assembly as a whole. Guide tracks 376 and bushings 374 are preferably of an open-slotted design in order to allow the cable to be fed through bracket 370 more easily. Guide tracks 376 include one or more projections 378 that keep the Bowden cable wire in place (FIG. 10C). Projections 378 are preferably rounded or beveled on the side away from guide track 376 to facilitate entry of the cable into guide track 376 but relatively flat on the side facing guide track 376 to keep the cable from slipping out.

The opposite end of guide wire 360 is overmolded with a bracket 380 that serves several purposes. Bracket 380 holds together the two parallel segments 390 of guide wire and also joins these to a transverse wire 400. Bracket 380 also has a bushing 382 for attachment of a Bowden cable 384 (FIG. 10B).

In one embodiment transverse wire 400 and parallel segments 390 are separate pieces. In another embodiment the lateral segments of transverse wire 400 are produced by bending parallel segments 390 of guide wire 360 laterally at right angles. Thus in this latter embodiment, guide wire 360 comprises a single wire that is bent to produce parallel segments 390 and transverse wire 400, with a central part of guide wire 360 being overmolded into bracket 370.

Guide wire 360 in one embodiment also has a center bracket 410 for attachment of a seat air duct (FIG. 10A). In this embodiment center bracket 410 firmly attaches to both of parallel segments 390, the firm attachment being achieved in one embodiment by having overmolded clips 412 that completely surround parallel segments 390. Thus when plastic clips 412 cool they shrink and tighten around the wire of parallel segments 390. Center bracket 410 is designed for attachment of an air duct for seat ventilation and for this reason has a central opening through which ducted air flows into the seat. Center bracket 410 has a plurality of attachment points 414 for accepting self-tapping fasteners for attachment of the air duct to center bracket 410.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support basket assembly for a seat comprising:
   a wire frame comprising a plurality of vertical support wires and a plurality of transverse wires, said plurality of vertical support wires being substantially parallel with each other and said plurality of transverse wires being substantially perpendicular to said plurality of vertical support wires; and
   an over-molded plastic support structure over-molded onto said wire frame so that the combination of said wire frame and said over-molded plastic support structure forms said lumbar support basket assembly that is flexible such that said lumbar support basket assembly can be arched;
   wherein said over-molded plastic support structure keeps said plurality of vertical support wires in a substantially parallel orientation relative to each other, and wherein said over-molded plastic support structure keeps said plurality of transverse wires in a substantially perpendicular orientation relative to said plurality of vertical support wires.

2. The lumbar support basket assembly of claim 1 wherein said over-molded plastic support structure is fenestrated.

3. The lumbar support basket assembly of claim 1 wherein said over-molded plastic support structure further comprises at least one bushing for connection of a cable.

4. The lumbar support basket assembly of claim 1 further comprising an over-molded plastic clip for pivotably attaching said lumbar support basket assembly to at least one crosswire such that when said lumbar support basket assembly is arched said over-molded plastic clip pivots around said at least one crosswire.

5. The lumbar support basket assembly of claim 1 further comprising an over-molded plastic clip for pivotably attaching said lumbar support basket assembly to at least one crosswire such that when said lumbar support basket assembly is arched said over-molded plastic clip pivots around said at least one crosswire, wherein said clip comprises a plurality of interleaved fingers.

6. The lumbar support basket assembly of claim 1 wherein there is no vertical support wire in an axial region of said lumbar support basket assembly.

7. The lumbar support basket assembly of claim 1
   wherein an axial region of said lumbar support basket assembly is recessed.

8. A lumbar support basket assembly for a seat comprising:
   a wire frame comprising a plurality of support wires, said plurality of support wires comprise a plurality of vertical support wires; and
   an over-molded plastic support structure over-molded onto said plurality of vertical support wires of said wire frame;
   wherein a portion of at least one said plurality of vertical support wires is not over-molded such that when said lumbar support basket assembly is arched the degree and location of bending of said lumbar support basket can be non-uniform.

9. The lumbar support basket assembly of claim 1
   wherein the thickness of said over-molded plastic support structure is non-uniform such that when said lumbar support basket assembly is arched the degree and location of bending of said lumbar support basket can be non-uniform.

10. A lumbar support guide wire assembly comprising:
    at least one guide wire; and
    at least one bracket over-molded onto said at least one guide wire;
    wherein said at least one guide wire is adapted for guiding a lumbar support basket such that the lumbar support basket can glide along said at least one guide wire;
    wherein said at least one bracket further comprises a first end bracket and a second end bracket,
    wherein said first end bracket comprises at least one bushing for attachment of a cable and a plurality of attachment points for attaching said at least one guide wire to a seat frame; and
    wherein said second end bracket comprises a bushing for attachment of a cable.

11. The lumbar support guide wire assembly of claim 10 wherein said at least one bracket further comprises a center bracket for attachment of an air duct.

12. A method of assembling a lumbar support, comprising the steps of:
    providing a guide wire assembly;
    providing a lumbar support basket assembly by over-molding plastic onto a wire frame comprising a plurality of vertical support wires and a plurality of transverse wires such that said over-molded plastic keeps said plurality of vertical support wires in a substantially parallel orientation relative to each other and such that said over-molded plastic keeps said plurality of transverse wires in a substantially perpendicular orientation relative to said plurality of vertical support wires;

providing at least one actuator adapted for arching said lumbar support basket assembly;

engaging the actuator with the lumbar support basket assembly; and attaching the lumbar support basket assembly to the guide wire assembly.

13. The method of claim 12 wherein the step of engaging the actuator with the lumbar support basket assembly comprises engaging the actuator with the lumbar support basket assembly using a cable.

14. An adjustable lumbar support assembly comprising:
a guide wire assembly comprising at least one guide wire;
a support basket assembly, comprising a wire frame comprising a plurality of vertical support wires and a plurality of transverse wires, and an over-molded plastic support structure over-molded onto said wire frame such that said over-molded plastic support structure keeps said plurality of vertical support wires in a substantially parallel orientation relative to each other and such that said over-molded plastic support structure keeps said plurality of transverse wires in a substantially perpendicular orientation relative to said plurality of vertical support wires, wherein said support basket assembly is slidably engaged with said guide wire assembly; and
at least one actuator operably engaged with said support basket for arching said support basket assembly.

15. The adjustable lumbar support assembly of claim 14 further comprising:
at least one cable, wherein said cable operably engages said actuator with said support basket assembly.

16. An adjustable lumbar support assembly comprising:
a guide wire assembly comprising at least one guide wire;
a support basket assembly, comprising a wire frame comprising a plurality of support wires and an over-molded plastic support structure over-molded onto said wire frame, wherein said support basket assembly is slidably engaged with said guide wire assembly;
at least one actuator operably engaged with said support basket for arching said support basket assembly; and
at least one cable for operably engaging said actuator with said support basket assembly,
wherein a portion of said cable is split to allow open access through a central portion of said support basket assembly.

17. The adjustable lumbar support assembly of claim 14 wherein said guide wire assembly has at least one bracket over-molded onto said at least one guide wire.

18. The adjustable lumbar support assembly of claim 14 further comprising at least one crosswire pivotably attached to said support basket assembly.

19. The adjustable lumbar support assembly of claim 14 wherein said guide wire assembly further comprises at least one cable routing piece engaged with an end of said guide wire.

20. The adjustable lumbar support assembly of claim 14 wherein said guide wire assembly further comprises at least one cable routing piece engaged with an end of said guide wire, and wherein said cable routing piece is adapted to engage a Bowden cable in a position normal to a long axis of said guide wire.

21. The adjustable lumbar support assembly of claim 14 wherein said guide wire assembly further comprises at least one cable routing piece engaged with an end of said guide wire, and wherein said cable routing piece is further configured to guide a wire of said Bowden cable through a turn of approximately ninety degrees at a fixed radius of curvature.

22. The lumbar support basket assembly of claim 1 wherein said lumbar support basket assembly has a thickness of less than fifteen millimeters in a central region.

23. The lumbar support basket assembly of claim 22 wherein said lumbar support basket assembly has a thickness of approximately ten millimeters in said central region.

24. A lumbar support assembly comprising:
a support basket assembly comprising a wire frame comprising a plurality of vertical support wires and a plurality of transverse wires, and an over-molded plastic support structure over-molded onto said wire frame such that said over-molded plastic support structure keeps said plurality of vertical support wires in a substantially parallel orientation relative to each other and such that said over-molded plastic support structure keeps said plurality of transverse wires in a substantially perpendicular orientation relative to said plurality of vertical support wires; and
at least one crosswire pivotably engaged with said support basket assembly, said crosswire further comprising a pulley over-molded thereon.

25. The lumbar support assembly of claim 24 wherein said crosswire is integrally over-molded with said plastic support structure.

26. The lumbar support assembly of claim 24 wherein said pulley is over-molded onto said crosswire while said pulley and said crosswire are rotatably positioned away from said support basket assembly.

27. The lumbar support assembly of claim 24 wherein said crosswire has at least one slider over-molded thereon.

28. A bracket for attaching a cable to a lumbar support device, comprising:
a first integral bushing and a second integral bushing for receiving a cable sleeve;
a first integral guide track for guiding a cable through a turn, said first guide track having a proximal end and a distal end, said proximal end of said first guide track being approximately collinear with said first bushing; and
a second integral guide track for guiding a cable through a turn, said second guide track having a proximal end and a distal end, said proximal end of said second guide track being collinear with said second bushing;
wherein the distal ends of said first and said second guide tracks converges in a central portion of said bracket; and
wherein said first bushing and said second bushing are laterally disposed on opposite sides of said bracket.

29. The bracket of claim 28 wherein said first bushing and said first guide track comprise open slots for guiding said cable into said guide track.

30. The bracket of claim 28 wherein said bracket further comprises a plurality of fingers for engaging said bracket onto a guide wire.

31. The bracket of claim 28 further comprising mounting holes for mounting said bracket onto a seat frame.

32. The bracket of claim 28 further comprising a projection near said first track to keep said cable from slipping out of said first track.

* * * * *